US012563527B2

(12) United States Patent     (10) Patent No.:   US 12,563,527 B2

Reial et al.     (45) Date of Patent:    Feb. 24, 2026

(54) SIGNALING PAGING EARLY INDICATORS (PEI) WITH ADDITIONAL INFORMATION

(71) Applicant: Telefonaktiebolaget LM Ericsson (publ), Stockholm (SE)

(72) Inventors: Andres Reial, Höllviken (SE); Niklas Andgart, Södra Sandby (SE); Sina Maleki, Malmö (SE); Ajit Nimbalker, Dublin, CA (US); Ali Nader, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 234 days.

(21) Appl. No.: 18/554,251

(22) PCT Filed: Apr. 6, 2022

(86) PCT No.: PCT/SE2022/050347

§ 371 (c)(1),
(2) Date: Oct. 6, 2023

(87) PCT Pub. No.: WO2022/216212

PCT Pub. Date: Oct. 13, 2022

(65) Prior Publication Data

US 2024/0381307 A1    Nov. 14, 2024

Related U.S. Application Data

(60) Provisional application No. 63/171,393, filed on Apr. 6, 2021.

(51) Int. Cl.
*H04W 68/00*      (2009.01)
*H04W 68/02*      (2009.01)

(52) U.S. Cl.
CPC ......... *H04W 68/005* (2013.01); *H04W 68/02* (2013.01)

(58) Field of Classification Search
CPC ........................... H04W 68/005; H04W 68/02
(Continued)

(56) References Cited

FOREIGN PATENT DOCUMENTS

| WO | 2020091643 A1 | 5/2020 |
| WO | 2021160647 A1 | 8/2021 |

OTHER PUBLICATIONS

International Search Report and Written Opinion dated Jun. 14, 2022 for International Application No. PCT/SE2022/050347 filed Apr. 6, 2022, consisting of 14—pages.
(Continued)

*Primary Examiner* — Mark G. Pannell
(74) *Attorney, Agent, or Firm* — Weisberg I.P. Law, P.A.

(57) ABSTRACT

A method, system and apparatus for signaling paging early indicators (PEI) with additional information. According to one aspect, a method includes signaling to the plurality of wireless devices (WDs) tracking reference signal (TRS) configurations for each of N paging subgroups of WDs, each TRS configuration being associated with an instance of additional information out of a set of possible instances of additional information. The method also includes transmitting to the at least one WD a TRS conveying the paging early indicator (PEI) in accordance with a TRS configuration for a particular paging subgroup of the N paging subgroups, the TRS configured to indicate to the at least one WD a subsequent paging occasion (PO) to be monitored by the at least one WD, the TRS being associated with a particular additional information instance out of the set of possible additional information instances.

20 Claims, 9 Drawing Sheets

(58) Field of Classification Search
USPC ........................................................ 455/458
See application file for complete search history.

(56) References Cited

OTHER PUBLICATIONS

3GPP TSG RAN WG1 #104-e R1-2100392; Title: Paging enhancement for UE power saving; Agenda Item: 8.7.1.1; Source: CATT; Document for: Discussion and Decision; Date and Location: Jan. 25-Feb. 5, 2021, e-Meeting; consisting of 17—pages.
3GPP TSG RAN WG1 #104-e R1-2100396; Title: System overhead analysis of PEI and TRS/CSI-RS for IDLE mode UE; Agenda Item: 8.7.3; Source: CATT; Document for: Discussion and Decision; Date and Location: Jan. 25-Feb. 5, 2021, e-Meeting; consisting of 4—pages.
3GPP TSG-RAN WG1 Meeting #104-e R1-2101555; Title: Design of Paging Enhancements; Agenda Item: 8.7.1.1; Source: Ericsson; Document for: Discussion and Decision; Date and Location: Jan. 25-Feb. 5, 2021, e-Meeting; consisting of 9—pages.
ETSI TS 138 211 V16.5.0; Technical Specification; 5G; NR; Physical channels and modulation (3GPP TS 38.211 version 16.5.0 Release 16); Apr. 2021, consisting of 138—pages.
ETSI TS 138 214 V16.5.0; Technical Specification; 5G; NR; Physical layer procedures for data (3GPP TS 38.214 version 16.5.0 Release 16); Apr. 2021, consisting of 173—pages.

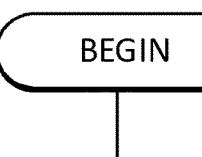
RECEIVE A NUMBER OF RESOURCE MAPPING CONFIGURATIONS S136
DETERMINE A NUMBER OF SUBGROUPS IN A SAME PAGING OCCASION BASED AT LEAST IN PART ON THE RECEIVED RESOURCE MAPPING CONFIGURATIONS S138
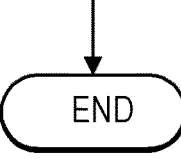
FIG. 8

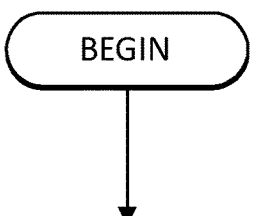

BEGIN

SIGNAL, TO THE PLURALITY OF WDS TRACKING REFERENCE SIGNAL, TRS, CONFIGURATIONS FOR EACH OF N PAGING SUBGROUPS OF WDS, THE PLURALITY OF WDS BEING SUB-GROUPED INTO THE N PAGING SUBGROUPS, N BEING AN INTEGER GREATER THAN ZERO, EACH TRS CONFIGURATION BEING ASSOCIATED WITH AN INSTANCE OF ADDITIONAL INFORMATION OUT OF A SET OF POSSIBLE INSTANCES OF ADDITIONAL INFORMATION S140

TRANSMIT TO THE AT LEAST ONE WD, A TRS CONVEYING THE PEI IN ACCORDANCE WITH A TRS CONFIGURATION FOR A PARTICULAR PAGING SUBGROUP OF THE N PAGING SUBGROUPS, THE AT LEAST ONE WD BEING INCLUDED IN THE PARTICULAR PAGING SUBGROUP, THE TRS CONFIGURED TO INDICATE TO THE AT LEAST ONE WD A SUBSEQUENT PAGING OCCASION, PO, TO BE MONITORED BY THE AT LEAST ONE WD, THE TRS BEING ASSOCIATED WITH A PARTICULAR ADDITIONAL INFORMATION INSTANCE OUT OF THE SET OF POSSIBLE ADDITIONAL INFORMATION INSTANCES S142

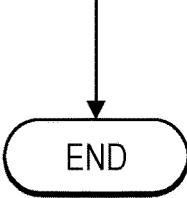

END

FIG. 9

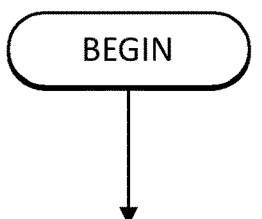

BEGIN

RECEIVE FROM THE NETWORK NODE, AT LEAST ONE TRACKING REFERENCE SIGNAL, TRS, CONFIGURATION, FOR EACH OF N PAGING SUBGROUPS OF WDS, THE PLURALITY OF WDS BEING SUB-GROUPED INTO THE N PAGING SUBGROUPS, N BEING AN INTEGER GREATER THAN ZERO, EACH OF THE AT LEAST ONE TRS CONFIGURATION BEING ASSOCIATED WITH AN INSTANCE OF ADDITIONAL INFORMATION OUT OF A SET OF POSSIBLE INSTANCES OF ADDITIONAL INFORMATION S144

RECEIVE, FROM THE NETWORK NODE, A TRS CONVEYING A PEI IN ACCORDANCE WITH A TRS CONFIGURATION FOR A PARTICULAR PAGING SUBGROUP OF THE N PAGING SUBGROUPS, THE WD BEING INCLUDED IN THE PARTICULAR PAGING SUBGROUP, THE TRS CONFIGURED TO INDICATE TO THE WD A SUBSEQUENT PAGING OCCASION, PO, TO BE MONITORED BY THE WD, THE TRS BEING ASSOCIATED WITH A PARTICULAR ADDITIONAL INFORMATION INSTANCE OUT OF THE SET OF POSSIBLE ADDITIONAL INFORMATION INSTANCES S146

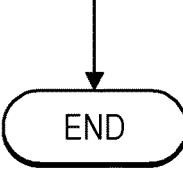

END

FIG. 10

SIGNALING PAGING EARLY INDICATORS (PEI) WITH ADDITIONAL INFORMATION

CROSS-REFERENCE TO RELATED APPLICATIONS

This application is a Submission Under 35 U.S.C. § 371 for U.S. National Stage Patent Application of International Application No.: PCT/SE2022/050347, filed Apr. 6, 2022 entitled "SIGNALING PAGING EARLY INDICATORS (PEI) WITH ADDITIONAL INFORMATION," which claims priority to U.S. Provisional Application No. 63/171,393, filed Apr. 6, 2021, entitled "TRS RESOURCE ALLO-CATION FOR PEI-TRS TRANSMISSION," the entireties of both of which are incorporated herein by reference.

TECHNICAL FIELD

The present disclosure relates to wireless communica-tions, and in particular, to signaling paging early indicators (PEI) with additional information.

BACKGROUND

The Third Generation Partnership Project (3GPP) has developed and is developing standards for Fourth Genera-tion (4G) (also referred to as Long Term Evolution (LTE)) and Fifth Generation (5G) (also referred to as New Radio (NR)) wireless communication systems. Such systems pro-vide, among other features, broadband communication between network nodes, such as base stations, and mobile wireless devices (WD), as well as communication between network nodes and between WDs. Sixth Generation (6G) wireless communication systems are also under develop-ment.

In NR 3GPP Release 15 (3 GPP Rel-15), a wireless device (WD) can be configured with up to four carrier bandwidth parts (BWPs) in the downlink with a single downlink carrier bandwidth part being active at a given time. A WD can be configured with up to four carrier bandwidth parts in the uplink with a single uplink carrier bandwidth part being active at a given time. If a WD is configured with a supplementary uplink, the WD can additionally be config-ured with up to four carrier bandwidth parts in the supple-mentary uplink with a single supplementary uplink carrier bandwidth part being active at a given time. For a carrier bandwidth part with a given numerology $\mu_i$, a contiguous set of physical resource blocks (PRBs) are defined and num-bered from 0 to $N_{BWP_i}^{size}-1$, where i is the index of the carrier bandwidth part. A resource block (RB) is defined as 12 consecutive subcarriers in the frequency domain.

Multiple orthogonal frequency-division multiplexing (OFDM) numerologies, $\mu$, are supported in NR as given by Table 1, where the subcarrier spacing, $\Delta f$, and the cyclic prefix for a carrier bandwidth part are configured by different higher layer parameters for downlink (DL) and uplink (UL), respectively:

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

A downlink physical channel corresponds to a set of resource elements carrying information originating from higher layers. The following downlink physical channels are defined:

Physical Downlink Shared Channel, PDSCH;
Physical Broadcast Channel, PBCH;
Physical Downlink Control Channel, PDCCH.

The PDSCH is the main physical channel used for unicast downlink data transmission, but the PDSCH is also used for transmission of random access response (RAR), certain system information blocks (SIB) and paging information. The PBCH carries the basic system information required by the WD to access the network. The PDCCH is used for transmitting downlink control information (DCI), including scheduling decisions, required for reception of the PDSCH, and for uplink scheduling grants enabling transmission on the physical uplink shared channel (PUSCH).

An uplink physical channel corresponds to a set of resource elements carrying information originating from higher layers. The following uplink physical channels are defined:

Physical Uplink Shared Channel, PUSCH;
Physical Uplink Control Channel, PUCCH;
Physical Random Access Channel, PRACH.

The PUSCH is the uplink counterpart to the PDSCH. The PUCCH is used by WDs to transmit uplink control infor-mation (UCI), including hybrid automatic repeat request (HARQ) acknowledgements, channel state information (CSI) reports, etc. The PRACH is used for random access preamble transmission.

The ultra-lean design principle in NR seeks to minimize the always-on transmissions that exist in earlier systems (e.g., LTE cell-specific reference signal (CRS) reference symbols). Instead, NR provides reference symbols such as synchronization signal blocks (SSBs) on a periodic basis, or by default once every 20 ms. In addition, for connected mode WDs, typically a set of reference symbols are pro-vided for optimal link performance. Some of these reference symbols are clarified below.

CSI-RS for Tracking

A WD in radio resource control (RRC) connected mode is expected to receive from the network node the RRC layer WD-specific configuration of a non-zero power (NZP) chan-nel state information reference signal (CSI-RS)-ResourceSet configured to include the parameter trs-Info. For a NZP-CSI-RS-ResourceSet configured with the higher layer parameter trs-Info set to "true", the WD assumes that the antenna port with the same port index of the configured NZP CSI-RS resources in the NZP-CSI-RS-ResourceSet is the same.

For frequency range 1 (FR1), the WD may be configured with one or more NZP CSI-RS set(s), where a NZP-CSI-RS-ResourceSet consists of four periodic NZP CSI-RS resources in two consecutive slots with two periodic NZP CSI-RS resources in each slot. If no two consecutive slots are indicated as downlink slots by tdd-UL-DL-ConfigurationCommon or tdd-UL-DL-ConfigDedicated, then the WD may be configured with one or more NZP CSI-RS set(s), where a NZP-CSI-RS-ResourceSet consists of two periodic NZP CSI-RS resources in one slot.

For frequency range 2 (FR2), the WD may be configured with one or more NZP CSI-RS set(s), where a NZP-CSI-RS-ResourceSet consists of two periodic CSI-RS resources in one slot or with a NZP-CSI-RS-Resource- Set of four periodic NZP CSI-RS resources in two consecutive slots with two periodic NZP CSI-RS resources in each slot.

A WD configured with NZP-CSI-RS-ResourceSet(s) configured with higher layer parameter trs-Info may have the CSI-RS resources configured as:

Periodic, with the CSI-RS resources in the NZP-CSI-RS-ResourceSet configured with same periodicity, bandwidth and subcarrier location; or Periodic CSI-RS resource in one set and aperiodic CSI-RS resources in a second set, with the aperiodic CSI-RS and periodic CSI-RS resource having the same bandwidth (with same a same resource block (RB) location) and the aperiodic CSI-RS being 'QCL-Type-A' and 'QCL-TypeD', where applicable, with the periodic CSI-RS resources.

For frequency range 2, the WD does not expect that the scheduling offset between the last symbol of the PDCCH carrying the triggering DCI and the first symbol of the aperiodic CSI-RS resources is smaller than the WD reported ThresholdSched-Offset. The WD may expect that the periodic CSI-RS resource set and aperiodic CSI-RS resource set are configured with the same number of CSI-RS resources and with the same number of CSI-RS resources in a slot. For the aperiodic CSI-RS resource set if triggered, and if the associated periodic CSI-RS resource set is configured with four periodic CSI-RS resources with two consecutive slots with two periodic CSI-RS resources in each slot, the higher layer parameter aperiodic TriggeringOffset indicates the triggering offset for the first slot for the first two CSI-RS resources in the set.

A WD does not expect to be configured with a CSI-ReportConfig that is linked to a CSI-ResourceConfig containing an NZP-CSI-RS-ResourceSet configured with trs-Info and with the CSI-ReportConfig configured with the higher layer parameter timeRestrictionForChannelMeasurements set to 'configured'.

A WD does not expect to be configured with a CSI-ReportConfig with the higher layer parameter reportQuantity set to other than 'none' for aperiodic NZP CSI-RS resource set configured with trs-Info.

A WD does not expect to be configured with a CSI-ReportConfig for periodic NZP CSI-RS resource set configured with trs-Info.

A WD does not expect to be configured with a NZP-CSI-RS-ResourceSet configured both with trs-Info and repetition.

Each CSI-RS resource, defined in 3GPP Technical Standard (TS) 38.211, Clause 7.4.1.5.3, is configured by the higher layer parameter NZP-CSI-RS-Resource with the following restrictions:

the time-domain locations of the two CSI-RS resources in a slot, or of the four CSI-RS resources in two consecutive slots (which are the same across two consecutive slots), as defined by higher layer parameter CSI-RS-resourceMapping, is given by one of:
$l \in \{4,8\}$, $l \in \{5,9\}$, or $l \in \{6,10\}$ for frequency range 1 and frequency range 2;
$l \in \{0,4\}$, $l \in \{1,5\}$, $l \in \{2,6\}$, $l \in \{3,7\}$, $l \in \{7,11\}$, $l \in \{8, 12\}$ or $l \in \{9,13\}$ for frequency range 2;

a single port CSI-RS resource with density $\rho$=3 given by Table 7.4.1.5.3-1 of 3GPP [4, TS 38.211] and higher layer parameter density configured by CSI-RS-ResourceMapping;

the bandwidth of the CSI-RS resource, as given by the higher layer parameter freqBand configured by CSI-RS-ResourceMapping, is the minimum of 52 and $N_{BWP,i}^{size}$ resource blocks, or is equal to $N_{BWP,i}^{size}$ resource blocks. For operation with shared spectrum channel access, freqBand configured by CSI-RS-ResourceMapping, is the minimum of 48 and $N_{BWP,i}^{size}$ resource blocks, or is equal to $N_{BWP,i}^{size}$ resource blocks;

the WD is not expected to be configured with the periodicity of $2^{\mu} \times 10$ slots if the bandwidth of CSI-RS resource is larger than 52 resource blocks;

the periodicity and slot offset for periodic NZP CSI-RS resources, as given by the higher layer parameter periodicityAndOffset configured by NZP-CSI-RS-Resource, is one of $2^{\mu}X_p$ slots where $x_p$=10, 20, 40, or 80 and where $\mu$ is defined in Clause 4.3 of 3GPP [4, TS 38.211]; and/or the same powerControlOffset and powerControlOffsetSS given by NZP-CSI-RS-Resource value across all resources.

NZP CSI-RS

The WD can be configured with one or more NZP CSI-RS resource set configuration(s) as indicated by the higher layer parameters CSI-ResourceConfig, and NZP-CSI-RS-ResourceSet. Each NZP CSI-RS resource set consists of K≥1 NZP CSI-RS resource(s).

The following example parameters for which the WD may assume non-zero transmission power for CSI-RS resource are configured via the higher layer parameter NZP-CSI-RS-Resource, CSI-ResourceConfig and NZP-CSI-RS-ResourceSet for each CSI-RS resource configuration:

nzp-CSI-RS-ResourceId determines CSI-RS resource configuration identity;

periodicityAndOffset defines the CSI-RS periodicity and slot offset for periodic/semi-persistent CSI-RS. All the CSI-RS resources within one set are configured with the same periodicity, while the slot offset can be same or different for different CSI-RS resources;

resourceMapping defines the number of ports, CDM-type, and OFDM symbol and subcarrier occupancy of the CSI-RS resource within a slot that are given in Clause 7.4.1.5 of 3GPP TS 38.211;

nrofPorts in resourceMapping defines the number of CSI-RS ports, where the allowable values are given in Clause 7.4.1.5 of 3GPP TS 38.211;

density in resourceMapping defines CSI-RS frequency density of each CSI-RS port per PRB, and CSI-RS PRB offset in case of the density value of ½, where the allowable values are given in Clause 7.4.1.5 of 3GPP TS 38.211. For density ½, the odd/even PRB allocation indicated in density is with respect to the common resource block grid;

cdm-Type in resourceMapping defines CDM values and pattern, where the allowable values are given in Clause 7.4.1.5 of 3GPP TS 38.211;

powerControlOffset: which is the assumed ratio of PDSCH energy per resource element (EPRE) to NZP CSI-RS EPRE when WD derives CSI feedback and takes values in the range of [−8, 15] dB with 1 dB step size;

powerControlOffsetSS: which is the assumed ratio of NZP CSI-RS EPRE to SS/PBCH block EPRE';

scramblingID defines scrambling ID of CSI-RS with length of 10 bits;

BWP-Id in (SI-ResourceConfig defines which bandwidth part the configured CSI-RS is located in;

repetition in NZP-CSI-RS-ResourceSet is associated with a CSI-RS resource set and defines whether WD can assume the CSI-RS resources within the NZP CSI-RS Resource Set are transmitted with the same downlink spatial domain transmission filter or not as described in 3GPP TS Clause 5.1.6.1.2. and can be configured only when the higher layer parameter reportQuantity associated with all the reporting settings linked with the CSI-RS resource set is set to 'cri-RSRP', 'cri-SINR' or 'none';

qcl-InfoPeriodicCSI-RS contains a reference to a TCI-State indicating QCL source RS(s) and QCL type(s). If the TCI-State is configured with a reference to an RS with 'QCL-TypeD' association, that RS may be an SS/PBCH block located in the same or different CC/DL BWP or a CSI-RS resource configured as periodic located in the same or different CC/DL BWP;

trs-Info in NZP-CSI-RS-ResourceSet is associated with a CSI-RS resource set and for which the WD can assume that the antenna port with the same port index of the configured NZP CSI-RS resources in the NZP-CSI-RS-ResourceSet is the same as described in Clause 5.1.6.1.1 and can be configured when reporting setting is not configured or when the higher layer parameter reportQuantity associated with all the reporting settings linked with the CSI-RS resource set is set to 'none'.

All CSI-RS resources within one set are configured with the same density and same nrofPorts, except for the NZP CSI-RS resources used for interference measurement. The WD expects that all the CSI-RS resources of a resource set are configured with the same starting RB and number of RBs and the same cdm-type.

The bandwidth and initial common resource block (CRB) index of a CSI-RS resource within a BWP, as defined in Clause 7.4.1.5 of 3GPP [4, TS 38.211], are determined based on the higher layer parameters nrofRBs and startingRB, respectively, within the CSI-FrequencyOccupation information element (IE) configured by the higher layer parameter freqBand within the CSI-RS-ResourceMapping IE. Both nrofRBs and startingRB are configured as integer multiples of 4 RBs, and the reference point for startingRB is CRB 0 on the common resource block grid. If startingRB$<N_{BWP}^{start}$, the WD may assume that the initial CRB index of the CSI-RS resource is $N_{initial\ RB}=N_{BWP}^{start}$, otherwise $N_{initial\ RB}$=startingRB. If nrofRBs$>N_{BWP}^{size}$+ $N_{BWP}^{start}-N_{initial\ RB}$, the WD may assume that the bandwidth of the CSI-RS resource is $N_{CSI-RS}^{BW}=N_{BWP}^{size}$+ $N_{BWP}^{start}-N_{initial\ RB}$, otherwise $N_{CSI-RS}^{BW}$=nrofRBs. In all cases, the WD may expect that $N_{CSI-RS}^{BW}\geq$min (24, $N_{BWP}^{size}$).

The IE NZP-CSI-RS-Resource is used to configure Non-Zero-Power (NZP) CSI-RS transmitted in the cell where the IE is included, which the WD may be configured to measure on (see 3GPP TS 38.214, clause 5.2.2.3.1).

NZP-CSI-RS-Resource Information Element

```
-- ASN1START
-- TAG-NZP-CSI-RS-RESOURCE-START
NZP-CSI-RS-Resource ::=        SEQUENCE {
    nzp-CSI-RS-ResourceId            NZP-CSI-RS-ResourceId,
    resourceMapping         CSI-RS-ResourceMapping,
    powerControlOffset      INTEGER (-8..15),
    powerControlOffsetSS         ENUMERATED{db-3, db0, db3,
OPTIONAL, -- Need R
    scramblingID         ScramblingId,
    periodicityAndOffset         CSI-ResourcePeriodicityAndOffset
OPTIONAL, -- Cond PeriodicOrSemiPersistent
    qcl-InfoPeriodicCSI-RS              TCI-StateId
OPTIONAL, -- Cond Periodic
    ...
}
-- TAG-NZP-CSI-RS-RESOURCE-STOP
-- ASN1STOP
```

| NZP-CSI-RS-Resource field descriptions |
| --- | periodicityAndOffset
Periodicity and slot offset sl1 corresponds to a periodicity of 1 slot, sl2 to a periodicity of two slots, and so on. The corresponding offset is also given in number of slots (see TS 38.214, clause 5.2.2.3.1)
powerControlOffset
Power offset of PDSCH RE to NZP CSI-RS RE. Value in dB (see TS 38.214, clauses 5.2.2.3.1 and 4.1)
powerControlOffsetSS
Power offset of NZP CSI-RS RE to SS RE. Value in dB (see TS 38.214, clause 5.2.2.3.1)
qcl-InfoPeriodicCSI-RS
For a target periodic CSI-RS, contains a reference to one TCI-State in TCI-States for providing the QCL source and QCL type. For periodic CSI-RS, the source can be SSB or another periodic-CSI-RS. Refers to the TCI-State which has this value for tci-StateId and is defined in tci-StatesToAddModList in the PDSCH-Config included in the BWP-Downlink corresponding to the serving cell and to the DL BWP to which the resource belongs to (see TS 38.214, clause 5.2.2.3.1)
resourceMapping
OFDM symbol location(s) in a slot and subcarrier occupancy in a PRB of the CSI-RS resource
scramblingID
Scrambling ID (see TS 38.214, clause 5.2.2.3.1)

| Conditional Presence | Explanation |
| --- | --- |
| Periodic | The field is optionally present, Need M, for periodic NZP-CSI-RS-Resources (as indicated in CSI-ResourceConfig). The field is absent otherwise |
| PeriodicOrSemiPersistent | The field is mandatory present, Need M, for periodic and semi-persistent NZP-CSI-RS-Resources (as indicated in CSI-ResourceConfig). The field is absent otherwise. |

The IE NZP-CSI-RS-ResourceId is used to identify one NZP-CSI-RS-Resource.

NZP-CSI-RS-ResourceId Information Element

```
-- ASN1START
-- TAG-NZP-CSI-RS-RESOURCEID-START
NZP-CSI-RS-ResourceId ::=    INTEGER (0..maxNrofNZP-CSI-RS-
Resources-1)
-- TAG-NZP-CSI-RS-RESOURCEID-STOP
-- ASN1STOP
        The IE NZP-CSI-RS-ResourceSet is a set of Non-Zero-Power (NZP)
CSI-RS resources (their IDs) and set-specific parameters.
        NZP-CSI-RS-ResourceSet information element
-- ASN1START
-- TAG-NZP-CSI-RS-RESOURCESET-START
NZP-CSI-RS-ResourceSet ::=    SEQUENCE {
    nzp-CSI-ResourceSetId         NZP-CSI-RS-ResourceSetId,
    nzp-CSI-RS-Resources         SEQUENCE (SIZE (1..maxNrofNZP-CSI-
RS-ResourcesPerSet)) OF NZP-CSI-RS-ResourceId,
    repetition              ENUMERATED { on, off }
OPTIONAL, -- Need S
    aperiodicTriggeringOffset      INTEGER(0..6)
OPTIONAL, -- Need S
    trs-Info              ENUMERATED {true}
OPTIONAL, -- Need R
    ...
}
-- TAG-NZP-CSI-RS-RESOURCESET-STOP
-- ASN1STOP
```

| NZP-CSI-RS-ResourceSet field descriptions |
| --- |
| aperiodicTriggeringOffset<br>Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the WD applies the value 0.<br>nzp-CSI-RS-Resources<br>NZP-CSI-RS-Resources associated with this NZP-CSI-RS resource set (see TS 38.214, clause 5.2). For CSI, there are at most 8 NZP CSI RS resources per resource set<br>repetition<br>Indicates whether repetition is on/off. If the field is set to 'OFF' or if the field is absent, the WD may not assume that the NZP-CSI-RS resources within the resource set are transmitted with the same downlink spatial domain transmission filter and with same NrofPorts in every symbol (see TS 38.214, clauses 5.2.2.3.1 and 5.1.6.1.2). Can only be configured for CSI-RS resource sets which are associated with CSI-ReportConfig with report of L1 RSRP or "no report"<br>trs-Info<br>Indicates that the antenna port for all NZP-CSI-RS resources in the CSI-RS resource set is same. If the field is absent or released the WD applies the value "false" (see TS 38.214, clause 5.2.2.3.1). |

The IE NZP-CSI-RS-ResourceSetId is used to identify one NZP-CSI-RS-ResourceSet.

NZP-CSI-RS-ResourceSetId Information Element

```
-- ASN1START
-- TAG-NZP-CSI-RS-RESOURCESETID-START
NZP-CSI-RS-ResourceSetId ::=   INTEGER (0..maxNrofNZP-CSI-RS-
ResourceSets-1)
-- TAG-NZP-CSI-RS-RESOURCESETID-STOP
-- ASN1STOP
```

The IE CSI-ResourceConfig defines a group of one or more NZP-CSI-RS-ResourceSet, CSI-IM-ResourceSet and/or CSI-SSB-ResourceSet.

CSI-ResourceConfig Information Element

| CSI-ResourceConfig field descriptions |
| --- |
| bwp-Id<br>The DL BWP which the CSI-RS associated with this CSI-ResourceConfig are located in (see TS 38.214 [19], clause 5.2.1.2<br>csi-ResourceConfigId<br>Used in CSI-ReportConfig to refer to an instance of CSI-ResourceConfig<br>csi-RS-ResourceSetList<br>Contains up to maxNrofNZP-CSI-RS-ResourceSetsPerConfig resource sets if ResourceConfigType is 'aperiodic' and 1 otherwise (see TS 38.214, clause 5.2.1.2)<br>csi-SSB-ResourceSetList<br>List of SSB resources used for beam measurement and reporting in a resource set (see TS 38.214, section FFS_Section)<br>resource Type<br>Time domain behavior of resource configuration (see TS 38.214, clause 5.2.1.2). It does not apply to resources provided in the csi-SSB-ResourceSetList. |

The IE CSI-ResourceConfigId is used to identify a CSI-ResourceConfig.

CSI-ResourceConfigId Information Element

```
-- ASN1START
-- TAG-CSI-RESOURCECONFIGID-START
CSI-ResourceConfigId ::=   INTEGER (0..maxNrofCSI-
ResourceConfigurations-1)
-- TAG-CSI-RESOURCECONFIGID-STOP
-- ASN1STOP
```

The IE CSI-ResourcePeriodicityAndOffset is used to configure a periodicity and a corresponding offset for periodic and semi-persistent CSI resources, and for periodic and semi-persistent reporting on PUCCH. both, the periodicity and the offset are given in number of slots. The periodicity value slots4 corresponds to 4 slots, slots5 corresponds to 5 slots, and so on.

```
-- ASN1START
-- TAG-CSI-RESOURCECONFIG-START
CSI-ResourceConfig ::=          SEQUENCE {
    csi-ResourceConfigId           CSI-ResourceConfigId,
    csi-RS-ResourceSetList         CHOICE {
        nzp-CSI-RS-SSB               SEQUENCE {
            nzp-CSI-RS-ResourceSetList SEQUENCE (SIZE (1..maxNrofNZP-
CSI-RS-ResourceSetsPerConfig)) OF NZP-CSI-RS-ResourceSetId
OPTIONAL, -- Need R
        csi-SSB-ResourceSetList             SEQUENCE (SIZE (1..maxNrofCSI-SSB-
ResourceSetsPerConfig)) OF CSI-SSB-ResourceSetId
OPTIONAL -- Need R
        },
        csi-IM-ResourceSetList             SEQUENCE (SIZE (1..maxNrofCSI-IM-
ResourceSetsPerConfig)) OF CSI-IM-ResourceSetId
    },
    bwp-Id            BWP-Id,
    resourceType               ENUMERATED { aperiodic, semiPersistent,
periodic },
    ...
}
-- TAG-CSI-RESOURCECONFIG-STOP
-- ASN1STOP
```

CSI-ResourcePeriodicityAndOffset Information Element

```
-- ASN1START
-- TAG-CSI-RESOURCEPERIODICITYANDOFFSET-START
CSI-ResourcePeriodicityAndOffset ::=   CHOICE {
      slots4             INTEGER (0..3),
      slots5             INTEGER (0..4),
      slots8             INTEGER (0..7),
      slots10            INTEGER (0..9),
      slots16            INTEGER (0..15),
      slots20            INTEGER (0..19),
      slots32            INTEGER (0..31),
      slots40            INTEGER (0..39),
      slots64            INTEGER (0..63),
      slots80            INTEGER (0..79),
      slots160           INTEGER (0..159),
      slots320           INTEGER (0..319),
      slots640           INTEGER (0..639)
      }
-- TAG-CSI-RESOURCEPERIODICITYANDOFFSET-STOP
-- ASN1STOP
```

The IE CSI-RS-ResourceConfigMobility is used to con-figure CSI-RS based RRM measurements.

CSI-RS-ResourceConfigMobility Information Element

```
-- ASN1START
-- TAG-CSI-RS-RESOURCECONFIGMOBILITY-START
CSI-RS-ResourceConfigMobility ::=   SEQUENCE {
   subcarrierSpacing                SubcarrierSpacing,
   csi-RS-CellList-Mobility          SEQUENCE (SIZE (1..maxNrofCSI-RS-
CellsRRM)) OF CSI-RS-CellMobility,
   ... ,
   [[
   refServCellIndex-v1530            ServCellIndex
OPTIONAL -- Need S
   ]]
}
CSI-RS-CellMobility ::=            SEQUENCE {
   cellId              PhysCellId,
   csi-rs-MeasurementBW              SEQUENCE {
      nrofPRBs                ENUMERATED { size24, size48, size96,
size192, size264},
      startPRB                INTEGER(0..2169)
   },
   density              ENUMERATED {d1,d3}
OPTIONAL, -- Need R
   csi-rs-ResourceList-Mobility         SEQUENCE (SIZE (1..maxNrofCSI-RS-
ResourcesRRM)) OF CSI-RS-Resource-Mobility
}
CSI-RS-Resource-Mobility ::=          SEQUENCE {
   csi-RS-Index             CSI-RS-Index,
   slotConfig              CHOICE {
      ms4                INTEGER (0..31),
      ms5                INTEGER (0..39),
      ms10               INTEGER (0..79),
      ms20               INTEGER (0..159),
      ms40               INTEGER (0..319)
   },
   associatedSSB             SEQUENCE {
      ssb-Index               SSB-Index,
      isQuasiColocated          BOOLEAN
   }
OPTIONAL, -- Need R
   frequency DomainAllocation             CHOICE {
      row1                BIT STRING (SIZE (4)),
      row2                BIT STRING (SIZE (12))
   },
   firstOFDMSymbolInTimeDomain           INTEGER (0..13),
   sequenceGenerationConfig          INTEGER (0..1023),
   ...
}
CSI-RS-Index ::=          INTEGER (0..maxNrofCSI-RS-
ResourcesRRM-1)
-- TAG-CSI-RS-RESOURCECONFIGMOBILITY-STOP
-- ASN1STOP
```

CSI-RS-CellMobility field descriptions csi-rs-ResourceList-Mobility
List of CSI-RS resources for mobility. The maximum number of CSI-RS resources that can be configured per frequency layer depends on the configuration of associatedSSB (see TS 38.214, clause 5.1.6.1.3).

density
Frequency domain density for the 1-port CSI-RS for L3 mobility Corresponds to L1 parameter 'Density' (see FFS_Spec, section FFS_Section).

nrofPRBs
Allowed size of the measurement BW in PRBs Corresponds to L1 parameter 'CSI-RS-measurementBW-size' (see FFS_Spec, section FFS_Section).

startPRB
Starting PRB index of the measurement bandwidth Corresponds to L1 parameter 'CSI-RS-measurement-BW-start' (see FFS_Spec, section FFS Section) FFS_Value: Upper edge of value range unclear in RAN1.

CSI-RS-ResourceConfigMobility field descriptions csi-RS-CellList-Mobility
List of cells
refServCellIndex
Indicates the serving cell providing the timing reference for CSI-RS
resources without associatedSSB. The field may be present only if there is
at least one CSI-RS resource configured without associatedSSB. In case
there is at least one CSI-RS resource configured without associatedSSB
and this field is absent, the WD may use the timing of the PCell.
The CSI-RS resources and the serving cell indicated by refServCellIndex
for timing reference should be located in the same band.
subcarrierSpacing
Subcarrier spacing of CSI-RS. Only the values 15, 30 or 60 kHz (<6
GHz), 60 or 120 kHz (>6 GHz) are applicable.

CSI-RS-Resource-Mobility field descriptions associatedSSB
If this field is present, the WD may base the timing of the CSI-RS
resource indicated in CSI-RS-Resource-Mobility on the timing of the
cell indicated by the cellId in the CSI-RS-CellMobility. In this case,
the WD is not required to monitor that CSI-RS resource if the WD cannot
detect the SS/PBCH block indicated by this associatedSSB and cellId. If
this field is absent, the WD may base the timing of the CSI-RS resource
indicated in CSI-RS-Resource-Mobility on the timing of the serving cell
indicated by refServCellIndex. In this case, the WD is required to measure
the CSI-RS resource even if SS/PBCH block(s) with cellId in the CSI-RS-
CellMobility are not detected.
CSI-RS resources with and without associatedSSB may be configured in
accordance with the rules in TS 38.214, clause 5.1.6.1.3.
csi-RS-Index
CSI-RS resource index associated to the CSI-RS resource to be measured
(and used for reporting).
firstOFDMSymbolInTimeDomain CSI-RS-Resource-Mobility field descriptions Time domain allocation within a physical resource block. The field
indicates the first OFDM symbol in the PRB used for CSI-RS, see TS
38.211, clause 7.4.1.5.3. Value 2 is supported only when DL-DMRS-
typeA-pos equals 3.
frequencyDomainAllocation
Frequency domain allocation within a physical resource block in
accordance with TS 38.211, clause 7.4.1.5.3 including table 7.4.1.5.2-1.
The number of bits that may be set to one depend on the chosen row in
that table. For the choice "other", the row can be determined from the
parameters below and from the number of bits set to 1 in
frequencyDomainAllocation.
isQuasiColocated
The CSI-RS resource is either QCL'ed not QCL'ed with the associated
SSB in spatial parameters (see TS 38.214, clause 5.1.6.1.3.
sequenceGenerationConfig
Scrambling ID for CSI-RS (see TS 38.211, clause 7.4.1.5.2).
slotConfig
Indicates the CSI-RS periodicity (in milliseconds) and for each periodicity
the offset (in number of slots). When subcarrierSpacingCSI-RS is set to
15 kHZ, the maximum offset values for periodicities
ms4/ms5/ms10/ms20/ms40 are 3/4/9/19/39 slots. When
subcarrierSpacingCSI-RS is set to 30 kHZ, the maximum offset values for
periodicities ms4/ms5/ms10/ms20/ms40 are 7/9/19/39/79 slots. When
subcarrierSpacingCSI-RS is set to 60 kHZ, the maximum offset values for
periodicities ms4/ms5/ms10/ms20/ms40 are 15/19/39/79/159 slots. When
subcarrierSpacingCSI-RS is set 120 kHZ, the maximum offset values for
periodicities ms4/ms5/ms10/ms20/ms40 are 31/39/79/159/319 slots.

The IE CSI-RS-ResourceMapping is used to configure the resource element mapping of a CSI-RS resource in time- and frequency domain.

CSI-RS-ResourceMapping Information Element

```
-- ASN1START
-- TAG-CSI-RS-RESOURCEMAPPING-START
CSI-RS-ResourceMapping ::=                   SEQUENCE {
    frequencyDomainAllocation                    CHOICE {
        row1                             BIT STRING (SIZE (4)),
        row2                             BIT STRING (SIZE (12)),
        row4                             BIT STRING (SIZE (3)),
        other                    BIT STRING (SIZE (6))
    },
    nrofPorts                        ENUMERATED {p1,p2,p4,p8,p12,p16,p24,p32},
    firstOFDMSymbolInTimeDomain                      INTEGER (0..13),
    firstOFDMSymbolInTimeDomain2                     INTEGER (2..12)
OPTIONAL, -- Need R
    cdm-Type                         ENUMERATED {noCDM, fd-CDM2, cdm4-
FD2-TD2, cdm8-FD2-TD4},
    density                  CHOICE
    dot5                     ENUMERATED {evenPRBs, oddPRBs},
        one                      NULL,
        three                    NULL,
        spare                    NULL
    },
    freqBand             CSI-FrequencyOccupation,
    ...
}
-- TAG-CSI-RS-RESOURCEMAPPING-STOP
-- ASN1STOP
```

CSI-RS-ResourceMapping field descriptions cdm-Type
CDM type (see TS 38.214, clause 5.2.2.3.1).
density
Density of CSI-RS resource measured in RE/port/PRB (see TS 38.211, clause 7.4.1.5.3).
Values 0.5 (dot5), 1 (one) and 3 (three) are allowed for X = 1, values 0.5 (dot5) and 1 (one) are allowed for X = 2, 16, 24 and 32, value 1 (one) is allowed for X = 4, 8, 12.
For density = ½, includes 1-bit indication for RB level comb offset indicating whether odd or even RBs are occupied by CSI-RS.
firstOFDMSymbolInTimeDomain2
Time domain allocation within a physical resource block. See TS 38.211, clause 7.4.1.5.3.
firstOFDMSymbolInTimeDomain
Time domain allocation within a physical resource block. The field indicates the first OFDM symbol in the PRB used for CSI-RS. See TS 38.211, clause 7.4.1.5.3. Value 2 is supported only when DL-DMRS-typeA-pos equals 3.
freqBand
Wideband or partial band CSI-RS, (see TS 38.214, clause 5.2.2.3.1)
frequencyDomainAllocation
Frequency domain allocation within a physical resource block in accordance with TS 38.211 [16], clause 7.4.1.5.3. The applicable row number in table 7.4.1.5.3-1 is determined by the frequencyDomainAllocation for rows 1, 2 and 4, and for other rows by matching the values in the column Ports, Density and CDMtype in table 7.4.1.5.3-1 with the values of nrofPorts, cdm-Type and density below and, when more than one row has the 3 values matching, by selecting the row where the column (k bar, 1 bar) in table 7.4.1.5.3-1 has indexes for k ranging from 0 to 2*n − 1 where n is the number of bits set to 1 in frequencyDomainAllocation.
nrofPorts
Number of ports (see TS 38.214, clause 5.2.2.3.1)

Paging Early Indication (PEI)

PEI is being standardized in 3GPP as a wakeup signal (WUS) for idle mode WDs, indicating whether a following paging occasion (PO) will contain paging for the paging group or subgroup to which a certain WD belongs. Based on the PEI detection result, the WD may prepare the receiver for potential PDSCH reception and proceed to monitor the paging PDCCH to obtain paging PDSCH resource allocation.

In its simplest form, the PEI is a 1-bit signal that indicates the presence or absence of paging PDCCH in a subsequent PO. However, the PEI may also carry additional information, the exact contents of which is yet to be defined. Such additional information may include paging subgroup index (e.g., 2-16 groups or subsets of the full WD population), one-to-many PO mapping (one PEI indicates possible presence of paging in multiple different upcoming POs or in multiple paging periods for a given PO), TRS availability to idle mode WDs, etc.

One option for PEI design is to reuse the 3GPP NR Rel-15 tracking reference signal (TRS) or CSI-RS design. A TRS may then be transmitted in a PEI occasion location, according to TRS resource allocation and PEI occasion definition provided, e.g., in system information (SI).

Embedding more information in PEI than the basic 1-bit paging/no-paging indication is not possible with a single-sequence signaling approach. Supporting additional payload requires defining multiple TRS resources in a systematic manner, solutions for which have not been established.

Also, targeting multiple WD groups when transmitting PEI for a certain PO may require transmitting multiple simultaneous TRS.

SUMMARY

Some embodiments advantageously provide methods, systems, and apparatuses for signaling paging early indicators (PEI) with additional information. Some embodiments provide multiplexing of the PEI TRS to minimize resource usage and maximize detection performance.

Methods and mechanisms are disclosed with which TRS-based PEI signaling may be used to convey additional information to idle WDs. Some features of some embodiments include:
1. TRS resource set parameters for conveying grouping information and additional information;
2. Targeting multiple subgroups per PO:
   Optimizing for minimum sequence set;
   Optimizing for minimum network resource usage;
3. Aspects of specifying sequence allocation and transmission pattern configurations in SI.

In some embodiments:
1. The WD receives TRS configurations for N PEI-TRS groups associated with the N paging subgroups, and additionally the WD receives multiple hypothesis configured via at least one configuration parameter within the group of TRS configurations, where the TRS is used as a PEI-TRS;
   1+the N PEI groups are differentiated via time/frequency (T/F) locations of PEI-TRS, or via different sequence generators; and/or
   1+the multiple hypothesis are distinguished via different sequence generators.

In some embodiments, the network node may configure and transmit multiple TRS efficiently to convey effective larger payload in TRS-based PEI transmission. Some embodiments increase WD power savings with limited network and/or resource impact.

According to one aspect, a method in a network node for signaling additional information in conjunction with signaling of a Paging Early Indicator, PEI, to at least one of a plurality of wireless devices, WDs, included in a paging group is provided. The method includes: signaling to the plurality of WDs tracking reference signal, TRS, configurations for each of N paging subgroups of WDs, the plurality of WDs being sub-grouped into the N paging subgroups, N being an integer greater than zero, each TRS configuration being associated with an instance of additional information out of a set of possible instances of additional information; and transmitting to the at least one WD a TRS conveying the PEI in accordance with a TRS configuration for a particular paging subgroup of the N paging subgroups, the at least one WD being included in the particular paging subgroup, the TRS configured to indicate to the at least one WD a subsequent paging occasion, PO, to be monitored by the at least one WD, the TRS being associated with a particular additional information instance out of the set of possible additional information instances.

According to this aspect, in some embodiments, each WD of the plurality of WDs is in at least one paging subgroup. In some embodiments, the plurality of WDs are distributed randomly among the N paging subgroups. In some embodiments, the plurality of WDs are distributed among the N paging subgroups based at least in part on at least one of: type of WD, a WD radio resource control, RRC, state, and a respective paging probability associated with each WD. In some embodiments, each of a plurality of the set of possible instances of additional information corresponds to a different sequence of a plurality of sequences. In some embodiments, the method includes transmitting a plurality of the different sequences on a same set of time-frequency resources. In some embodiments, the method includes mapping multiple paging subgroups to different time/frequency locations, wherein the mapping is performed so as to minimize a duration of a PEI monitoring window.

According to another aspect, a network node for signaling additional information in conjunction with signaling of a Paging Early Indicator, PEI, to at least one of a plurality of wireless devices, WDs, included in a paging group, is provided. The network node includes: processing circuitry configured to signal, to the plurality of WDs, tracking reference signal, TRS, configurations for each of N paging subgroups of WDs, the plurality of WDs being sub-grouped into the N paging subgroups, N being an integer greater than zero, each TRS configuration being associated with an instance of additional information out of a set of possible instances of additional information; and a radio interface in communication with the processing circuitry and configured to transmit to the at least one WD, a TRS conveying the PEI in accordance with a TRS configuration for a particular paging subgroup of the N paging subgroups, the at least one WD being included in the particular paging subgroup, the TRS configured to indicate to the at least one WD a subsequent paging occasion, PO, to be monitored by the at least one WD, the TRS being associated with a particular additional information instance out of the set of possible additional information instances.

According to this aspect, in some embodiments, each WD of the plurality of WDs is in at least one paging subgroup. In some embodiments, the plurality of WDs are distributed randomly among the N paging subgroups. In some embodiments, the plurality of WDs are distributed among the N paging groups based at least in part on at least one of: type of WD, a WD radio resource control, RRC, state, and a respective paging probability associated with each WD. In some embodiments, each of a plurality of the set of possible instances of additional information corresponds to a different sequence of a plurality of sequences. In some embodiments, the radio interface is further configured to transmit a plurality of the different sequences on a same set of time-frequency resources. In some embodiments, the processing circuitry is further configured to map multiple paging subgroups to different time/frequency locations, wherein the mapping is performed so as to minimize a duration of a PEI monitoring window.

According to yet another aspect, a method performed by a wireless device, WD, for receiving additional information in conjunction with Paging Early Indicator, PEI, signaling from a network node, the WD being one of a plurality of wireless devices, WDs, included in a paging group, is provided. The method includes: receiving from the network node, at least one tracking reference signal, TRS, configuration, for each of N paging subgroups of WDs, the plurality of WDs being sub-grouped into the N paging subgroups, N being an integer greater than zero, each of the at least one TRS configuration being associated with an instance of additional information out of a set of possible instances of additional information; and receiving, from the network node, a TRS conveying a PEI in accordance with a TRS configuration for a particular paging subgroup of the N paging subgroups, the WD being included in the particular paging subgroup, the TRS configured to indicate to the WD a subsequent paging occasion, PO, to be monitored by the WD, the TRS being associated with a particular additional information instance out of the set of possible additional information instances.

According to this aspect, in some embodiments, each of a plurality of the set of possible instances of additional information is associated with a respective sequence out of a set of sequences. In some embodiments, the receiving the TRS conveying the PEI includes monitoring for a plurality of sequences on a same time-frequency resource. In some embodiments, the method includes correlating a sequence in the received TRS with each of at least one sequence corresponding to a paging group to which the WD belongs. In some embodiments, the method includes, when the WD belongs to a plurality of paging groups, determining which paging group of the plurality of paging groups is being paged. In some embodiments, the method includes identifying the particular instance of additional information associated with the received TRS conveying the PEI by performing hypothesis testing based on the set of possible instances of additional information. In some embodiments, the method includes monitoring one or more subsequent POs based on the identified particular instance of additional information.

According to another aspect, a WD is configured for receiving additional information in conjunction with Paging Early Indicator, PEI, signaling from a network node, the WD being one of a plurality of wireless devices, WDs, included in a paging group. The WD includes a radio interface configured to: receive from the network node, at least one tracking reference signal, TRS, configuration, for each of N paging subgroups of WDs, the plurality of WDs being sub-grouped into the N paging subgroups, N being an integer greater than zero, each of the at least one TRS configuration being associated with an instance of additional information out of a set of possible instances of additional information; and receive, from the network node, a TRS conveying a PEI in accordance with a TRS configuration for a particular paging subgroup of the N paging subgroups, the WD being included in the particular paging subgroup, the TRS configured to indicate to the WD a subsequent paging occasion, PO, to be monitored by the WD, the TRS being associated with a particular additional information instance out of the set of possible additional information instances.

According to this aspect, in some embodiments, each of a plurality of the set of possible instances of additional information is associated with a respective sequence out of a set of sequences. In some embodiments, the radio interface being configured to receive the TRS conveying the PEI includes processing circuitry being configured to, via the radio interface, monitor for a plurality of sequences on a same time-frequency resource. In some embodiments, the processing circuitry is configured to correlate a sequence in the received TRS with each of at least one sequence corresponding to a paging group to which the WD belongs. In some embodiments, the processing circuitry is configured to: when the WD belongs to a plurality of paging groups, determine which paging group of the plurality of paging groups is being paged. In some embodiments, the processing circuitry is configured to identify the particular instance of additional information associated with the received TRS conveying the PEI by performing hypothesis testing based on the set of possible instances of additional information. In some embodiments, the processing circuitry is further configured to monitor one or more subsequent POs based on the identified particular instance of additional information.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 8 is a flowchart of an example process in a wireless device for receiving paging early indicators (PEI) with additional information;

FIG. 9 is a flowchart of another example process in a network node for signaling paging early indicators (PEI) with additional information;

FIG. 10 is a flowchart of another example process in a wireless device for receiving paging early indicators (PEI) with additional information;

DETAILED DESCRIPTION

Figure 1:
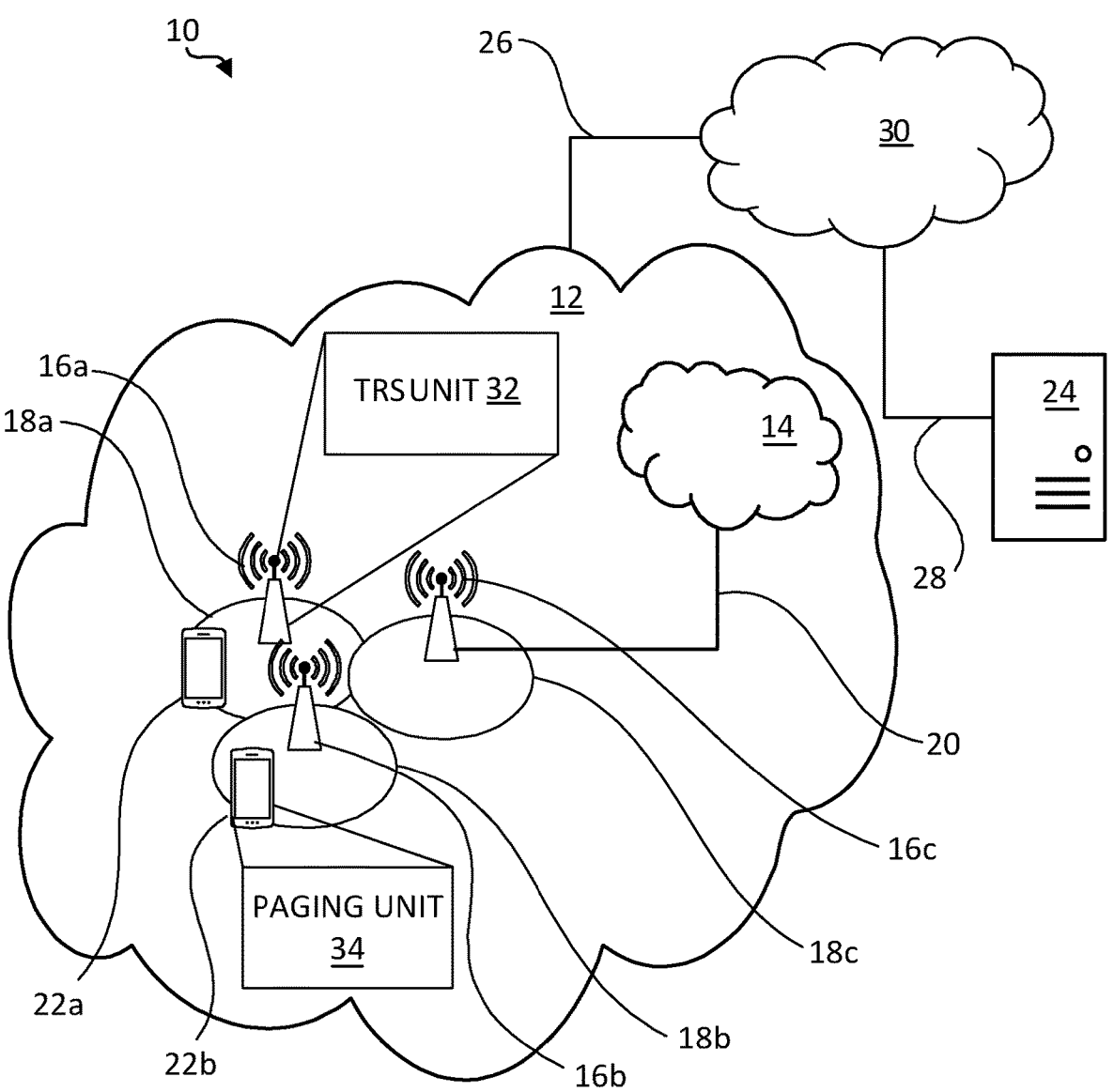
FIG. 1 is a schematic diagram of an example network architecture illustrating a communication system connected via an intermediate network to a host computer according to the principles in the present disclosure.

Before describing in detail example embodiments, it is noted that the embodiments reside primarily in combinations of apparatus components and processing steps related to signaling paging early indicators (PEI) with additional information. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals. The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipment (LEE), laptop mounted equipment (LME), USB dongles, Customer Premises Equipment (CPE), an Internet of Things (IoT) device, or a Narrowband IoT (NB-IoT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide signaling of paging early indicators (PEI) with additional information. Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a TRS unit 32 which is configured to generate a tracking reference signal, TRS, based at least in part on a minimization of a total number of TRS sequences and at least in part on an optimization of a paging early indicator, PEI, sequence detection performance. A wireless device 22 is configured to include a paging unit 34 which is configured to determine a number of subgroups in a same paging occasion based at least in part on received resource mapping configurations. In some embodiments, the TRS unit 32 is configured to configure the plurality of WDs with tracking reference signal, TRS, configurations for each of N paging subgroups of WDs, N being an integer greater than zero, each TRS configuration being associated with one instance of additional information out of $2^M$ possible instances of additional information, each additional information instance being represented by a respective hypothesis out of $2^M$ hypotheses. In some embodiments, the paging unit 34 is configured to monitor for a TRS conveying a paging early indicator, PEI, the TRS configured to indicate to the WD a subsequent paging occasion, PO, to be monitored by the WD, the TRS being associated with a particular hypothesis of the $2^M$ hypotheses.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or the connection 66 may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a TRS unit 32 which is configured to generate a tracking reference signal, TRS, based at least in part on a minimization of a total number of TRS sequences and at least in part on an optimization of a paging early indicator, PEI, sequence detection performance. In some embodiments, the TRS unit 32 is configured to configure the plurality of WDs with tracking reference signal, TRS, configurations for each of N paging subgroups of WDs, N being an integer greater than zero, each TRS configuration being associated with one instance of additional information out of $2^M$ possible instances of additional information, each additional information instance being represented by a respective hypothesis out of $2^M$ hypotheses.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a paging unit 34 which is configured to determine a number of subgroups in a same paging occasion based at least in part on received resource mapping configurations. In some embodiments, the paging unit 34 is configured to monitoring for a TRS conveying a paging early indicator, PEI, the TRS configured to indicate to the WD a subsequent paging occasion, PO, to be monitored by the WD, the TRS being associated with a particular hypothesis of the $2^M$ hypotheses.

Figure 2:
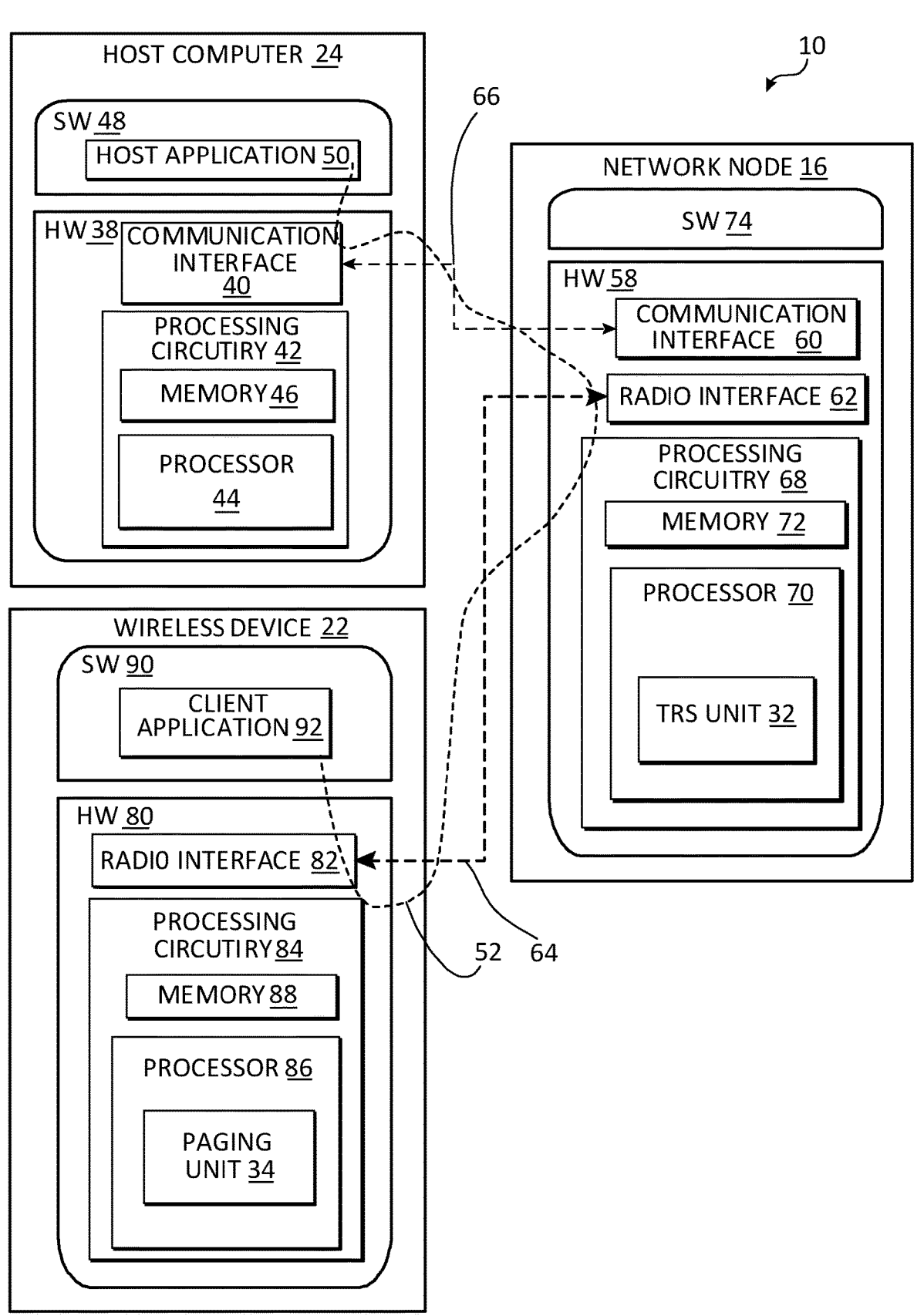
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which may be configured to hide from the WD 22 or from the service provider operating the host computer 24, or both. While the OTT connection 52 is active, the network infrastructure may further take decisions to dynamically change the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while monitoring propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending receipt of a transmission from the WD 22.

In some embodiments, the host computer 24 includes processing circuitry 42 and a communication interface 40 that is configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending receipt of a transmission from the network node 16.

Although FIGS. 1 and 2 show various "units" such as TRS unit 32, and paging unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
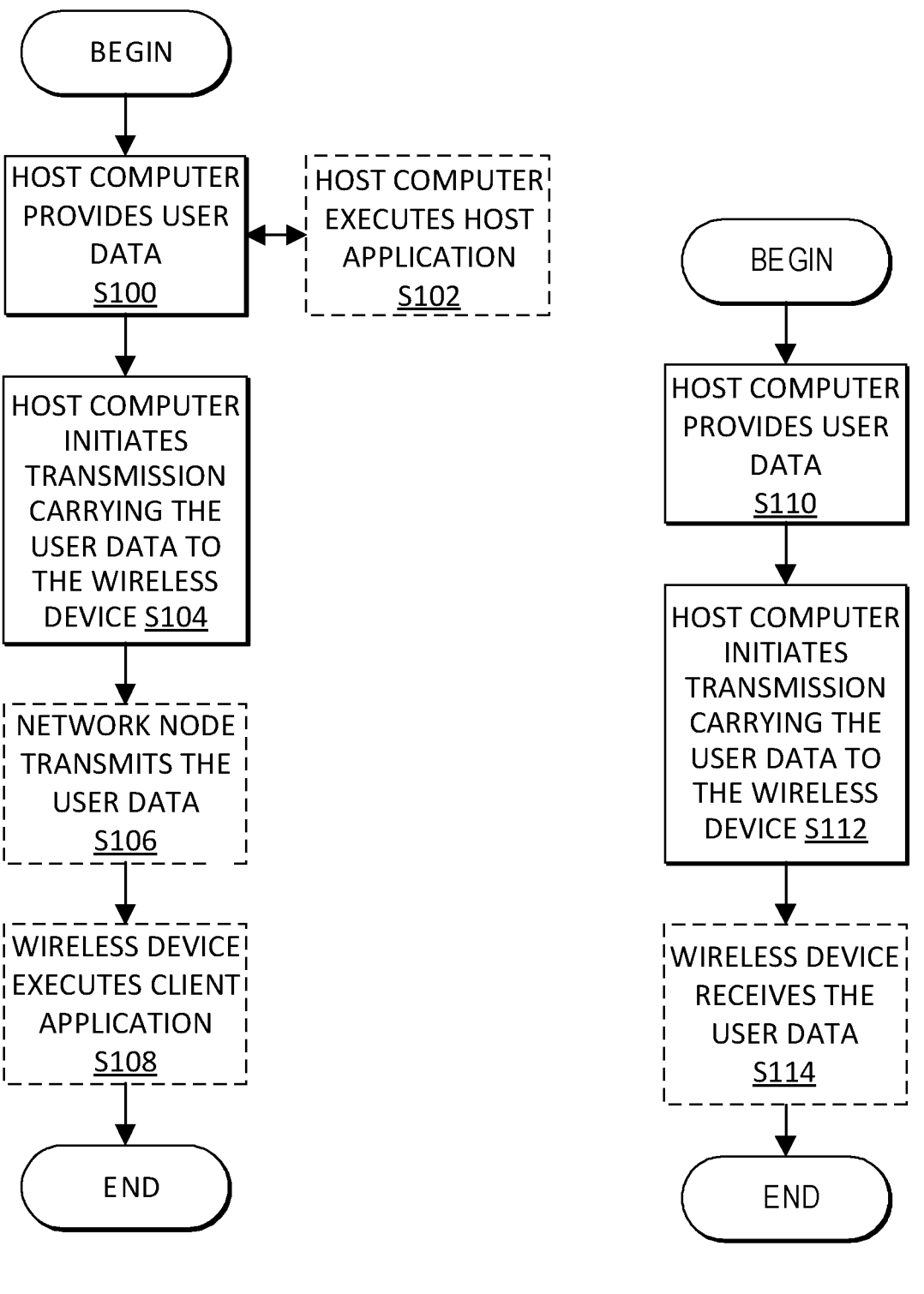
FIG. 3 is a flowchart illustrating example methods implemented in a communication system including a host computer, a network node and a wireless device for executing a client application at a wireless device according to some embodiments of the present disclosure.
FIG. 4 is a flowchart illustrating example methods implemented in a communication system including a host computer, a network node and a wireless device for receiving user data at a wireless device according to some embodiments of the present disclosure.

FIG. 3 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 5, 6:
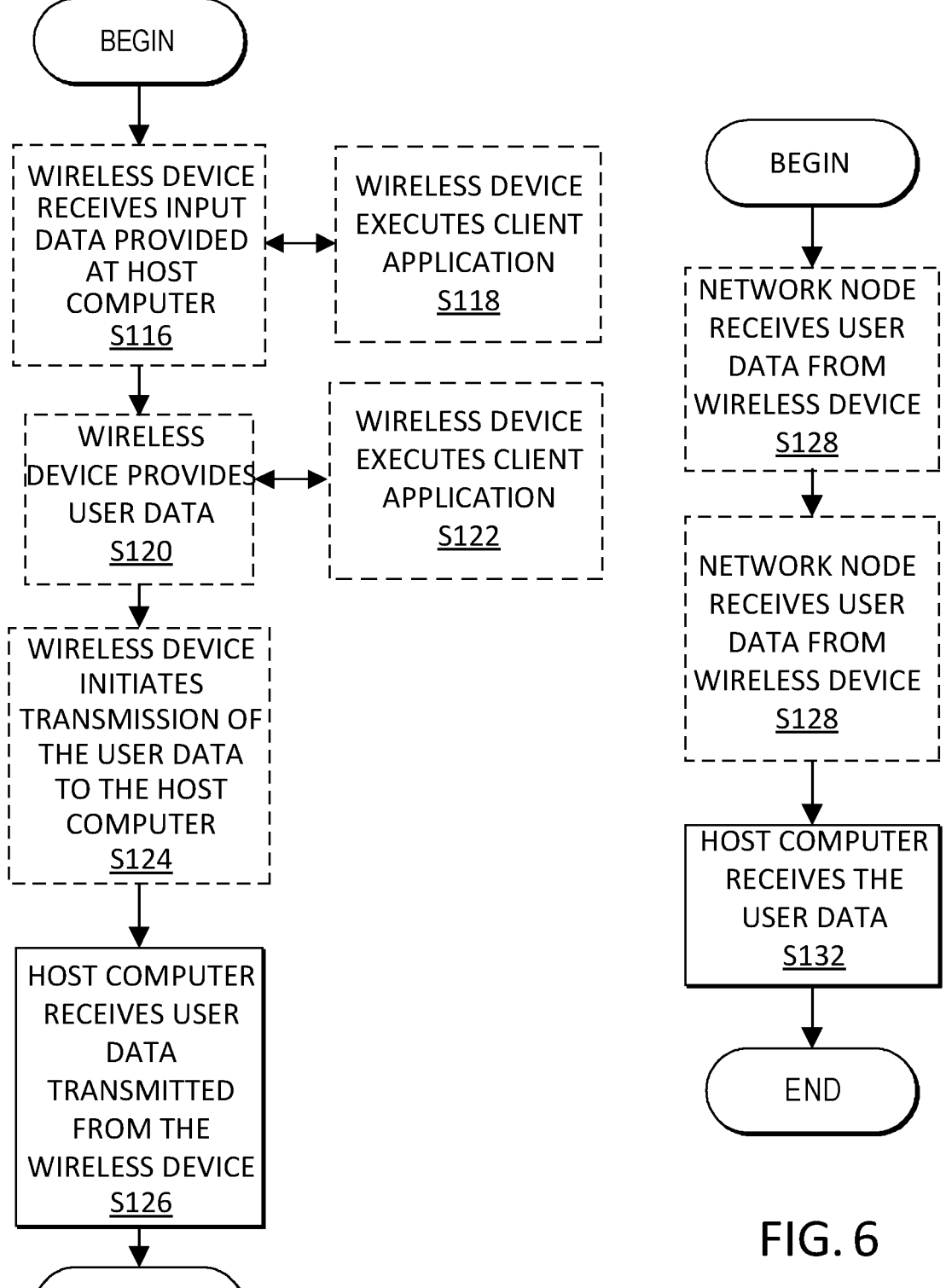
FIG. 5 is a flowchart illustrating example methods implemented in a communication system including a host computer, a network node and a wireless device for receiving user data from the wireless device at a host computer according to some embodiments of the present disclosure.
FIG. 6 is a flowchart illustrating example methods implemented in a communication system including a host computer, a network node and a wireless device for receiving user data at a host computer according to some embodiments of the present disclosure.

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides the user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
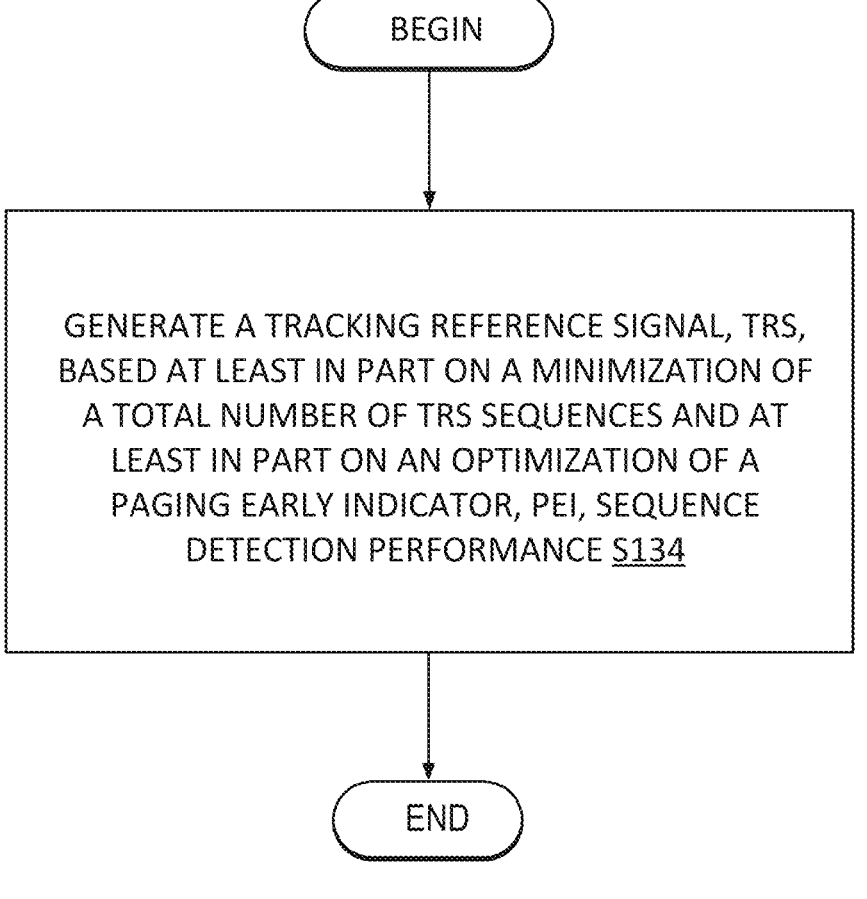
FIG. 7 is a flowchart of an example process in a network node for signaling paging early indicators (PEI) with additional information.

FIG. 7 is a flowchart of an example process in a network node 16 for tracking reference signal (TRS) resource allocation for Paging Early Indicator TRS (PEI-TRS) transmission. One or more blocks described herein may be performed by one or more elements of network node 16 such as by one or more of processing circuitry 68 (including the TRS unit 32), processor 70, radio interface 62 and/or communication interface 60. Network node 16 such as via processing circuitry 68 and/or processor 70 and/or radio interface 62 and/or communication interface 60 is configured to generate a tracking reference signal, TRS, based at least in part on a minimization of a total number of TRS sequences and at least in part on an optimization of a paging early indicator, PEI, sequence detection performance (Block S134).

FIG. 8 is a flowchart of an example process in a wireless device 22 according to some embodiments of the present disclosure. One or more blocks described herein may be performed by one or more elements of wireless device 22 such as by one or more of processing circuitry 84 (including the paging unit 34), processor 86, radio interface 82 and/or communication interface 60. Wireless device 22 such as via processing circuitry 84 and/or processor 86 and/or radio interface 82 is configured to receive a number of resource mapping configurations (Block S136). The process also includes determining a number of subgroups in a same paging occasion based at least in part on the received resource mapping configurations (Block S138).

FIG. 9 is a flowchart of an example process in a network node 16 for tracking reference signal (TRS) resource allocation for Paging Early Indicator TRS (PEI-TRS) transmission. One or more blocks described herein may be performed by one or more elements of network node 16 such as by one or more of processing circuitry 68 (including the TRS unit 32), processor 70, radio interface 62 and/or communication interface 60. Network node 16 such as via processing circuitry 68 and/or processor 70 and/or radio interface 62 and/or communication interface 60 is configured to signal or otherwise provide, to the plurality of WDs 22, tracking reference signal, TRS, configurations for each of N paging subgroups of WDs 22, the plurality of WDs being sub-grouped into the N paging subgroups, N being an integer greater than zero, each TRS configuration being associated with an instance or field of additional information out of a set of possible instances or fields of additional information (Block S140). The process also includes transmitting, to the at least one WD 22, a TRS conveying the PEI in accordance with a TRS configuration for a particular paging subgroup of the N paging subgroups, the at least one WD being included in the particular paging subgroup, the TRS being configured to indicate to the at least one WD 22 a subsequent paging occasion, PO, to be monitored by the at least one WD 22, the TRS being associated with a particular additional information instance or field out of the set of possible additional information instances or fields (Block S142). In some embodiments, each WD 22 of the plurality of WDs 22 is in at least one paging subgroup. In some embodiments, the plurality of WDs 22 are distributed randomly among the N paging subgroups. In some embodiments, the plurality of WDs 22 are distributed among the N paging subgroups based at least in part on at least one of: type of WD 22, a WD radio resource control, RRC, state, and a respective paging probability associated with each WD 22. In some embodiments, each of a plurality of the set of possible instances of additional information corresponds to a different sequence of a plurality of sequences. In some embodiments, the method also includes transmitting a plurality of the different sequences on a same set of time-frequency resources. In some embodiments, the process also includes mapping multiple paging subgroups to different time/frequency locations or resources, wherein the mapping may be performed so as to minimize a duration of a PEI monitoring window.

FIG. 10 is a flowchart of an example process in a wireless device 22 according to some embodiments of the present disclosure. One or more blocks described herein may be performed by one or more elements of wireless device 22 such as by one or more of processing circuitry 84 (including the paging unit 34), processor 86, radio interface 82 and/or communication interface 60. Wireless device 22 such as via processing circuitry 84 and/or processor 86 and/or radio interface 82 is configured to receive from the network node 16, at least one tracking reference signal, TRS, configuration, for each of N paging subgroups of WDs 22, the plurality of WDs being sub-grouped into the N paging subgroups, N being an integer greater than zero, each of the at least one TRS configuration being associated with an instance or field of additional information out of a set of possible instances or fields of additional information (Block S144). The process also includes receiving, from the network node 16, a TRS conveying a PEI in accordance with a TRS configuration for a particular paging subgroup of the N paging subgroups, the WD being included in the particular paging subgroup, the TRS configured to indicate to the WD 22 a subsequent paging occasion, PO, to be monitored by the WD 22, the TRS being associated with a particular additional information instance or field out of the set of possible additional information instances or fields (Block S146).

In some embodiments, each of a plurality of the set of possible instances or fields of additional information is associated with a respective sequence out of a set of sequences. In some embodiments, the radio interface 82 being configured to receive the TRS conveying the PEI includes the processing circuitry 84 being configured to, via the radio interface 82, monitor for a plurality of sequences on a same time-frequency resource. In some embodiments, the processing circuitry 84 is configured to correlate a sequence in the received TRS with each of at least one sequence corresponding to a paging group to which the WD 22 belongs. In some embodiments, the processing circuitry is configured to, when the WD 22 belongs to a plurality of paging groups, determining which paging group of the plurality of paging groups is being paged. In some embodiments, the processing circuitry 84 is configured to identify a particular instance or field of additional information associated with the received TRS conveying the PEI by performing hypothesis testing based on the set of possible instances or fields of additional information. In some embodiments, the processing circuitry 84 is further configured to monitor one or more subsequent POs based on the identified particular instance or field of additional information.

Having described the general process flow of arrangements of the disclosure and having provided examples of hardware and software arrangements for implementing the processes and functions of the disclosure, the sections below provide details and examples of arrangements for signaling paging early indicators (PEI) with additional information.

Note that although embodiments herein focus on examples based on a TRS for simplicity, it is understood that the same example embodiments can be extended to other reference signals.

PEI Payload Structure

The additional PEI information structure may be created by separating the number of paging subgroups N and the number of additional information bits M that may be conveyed for each subgroup.

The number of subgroups N determines the extent to which the effective group paging rate can be reduced. This in turn reduces the false paging probability. Let R denote the paging rate per user and denote K the number of users associated to the same PO. Assuming different users are independent in paging, the probability (P) of unnecessary alarm in a single group, can be calculated by $P=(1-R)(1-(1-R)^{K-1})$, while subgrouping reduces this to $P=(1-R)(1-(1-R)^{(K/N)-1})$. The expected number of subgroups N may be 2-16.

The grouping could be based on random distribution of WDs 22 among the paging resources. However, there could be other distribution mechanisms where the WD 22 is specifically assigned to various groups based on specific criteria. There could be different criteria for assigning different WDs 22 to various paging groups. Example of such criteria is grouping WDs 22 based on WD type, e.g., RedCap WDs 22 (requiring more robust transmission) versus evolved mobile broadband (eMBB) WDs 22 (typically with more advanced receivers). Another example would be grouping based on which radio resource control (RRC) state a WD 22 is in: Idle or Inactive (also known as core network/radio access network (CN/RAN) differentiated paging). In this example, WDs 22 in Idle which are only paged by the Core network (CN) only check for CN-initiated paging and are therefore not bothered by paging messages for RRC Inactive WDs 22 paged by RAN. Another example of grouping criteria is grouping the WDs 22 based on the paging load (paging probability) they create. As such, WDs 22 that are paged may be grouped together so that their paging messages is not triggering (unnecessarily waking up) WDs 22 that seldom contribute to paging traffic. Similarly, WDs 22 that are mobile (frequently changing cells) may be grouped together since they also lead to excessive paging traffic in lots of cells when the network is trying to reach them. Other examples are not precluded and the network may even dynamically assign WDs 22 to specific groups by assigning them to various groups either explicitly (group assignment) or implicitly through WD 22 identity assignment.

Additional information (M bits) may refer to one-to-many PO mapping information where one PEI may indicate: a possible presence of paging in multiple different upcoming POs or in multiple paging periods for a given PO, TRS availability to idle mode WDs 22, TB scaling applied for the PDSCH, and other additional information such as public warning system notification, system information update information, and the like. The number of hypotheses to cover additional information is denoted by $2^M$, in some embodiments, where M is an integer not less than zero. The number of hypotheses, and the corresponding number of instances, or fields, of additional information in a set of additional information instances, or fields, may be any integer that can be specified with the M number of bits (i.e. even if it is possible to define are $2^M$ possible additional information instances, less can be used as long as they can be distinguished (indexed) by the M bits).

The total number of TRS transmission combinations that may be required to convey the subgroup information and additional information may, in this example, be given by $2^{N+M}$, which may equal the number of TRS resource sets in some configurations. Alternatively, fewer resource sets may be used but multiple resources may be used simultaneously. Denote the TRS resource allocated to subgroup n (n∈ {1, . . . . N}) and to additional information state m (m∈ {1, . . . $2^M$}) by S(n,m).

TRS Resource Structure and PEI-TRS Sequence Allocation

In one example, each TRS burst has one or two slots and each slot in the TRS burst looks the same. The TRS is present in two orthogonal frequency division multiplexed (OFDM) symbols in each slot in the TRS burst.

For FR1 (<6 GHz) there are three alternative OFDM symbol pair positions within a slot: (4,8), (5,9) or (6,10). Note that the first symbol in a slot has index 0. For FR2 (>6 GHZ) all symbol pair positions within a slot with inter-symbol distance 4 are allowed.

Figure 11:
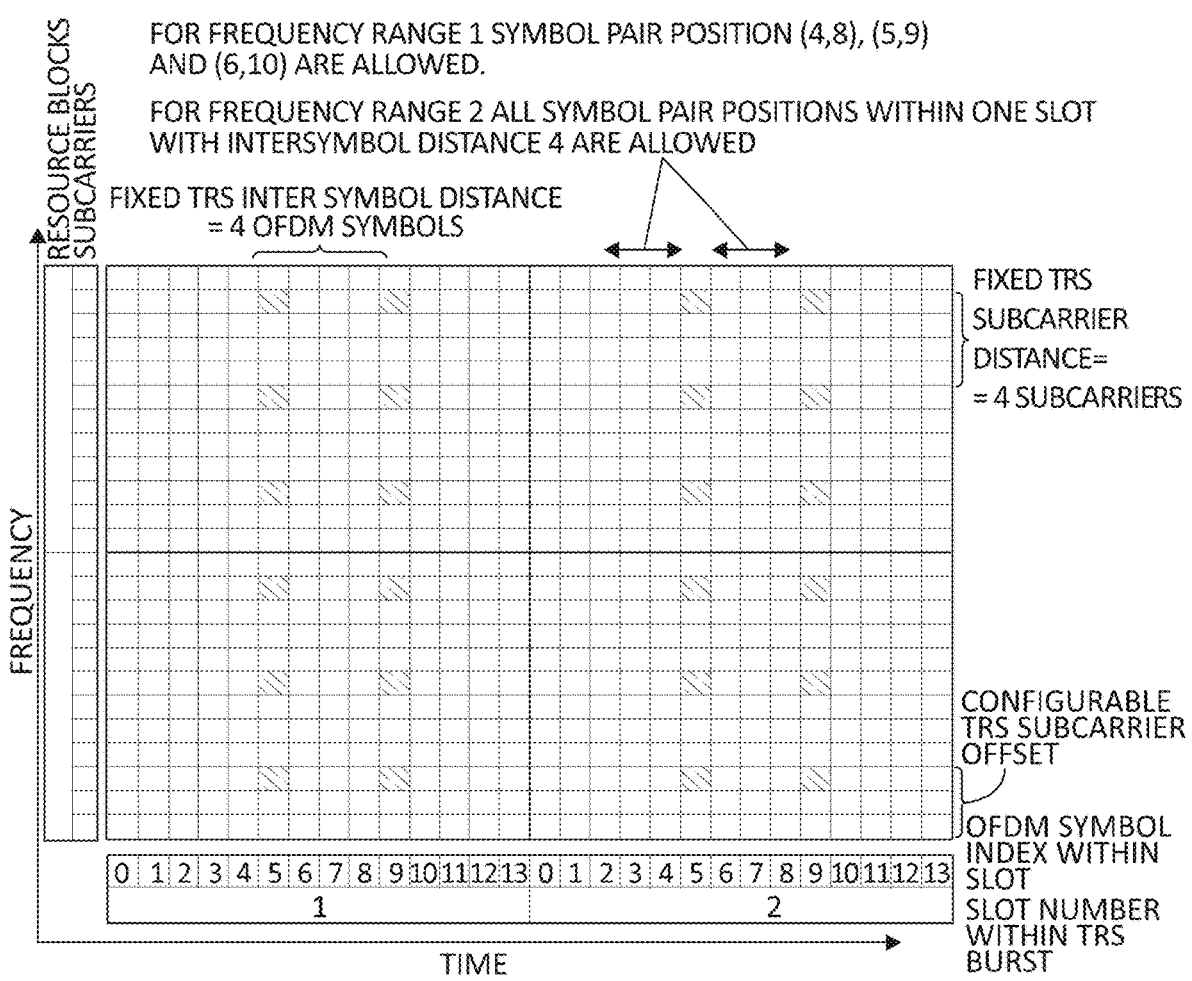
FIG. 11 illustrates resources allocated to TRS.

An example TRS structure for a 2-slot format in FR1 is shown in FIG. 11:

The bandwidth of the TRS is min (52RB, WD BWP) or WD BWP, where the first option reflects the case where minimum allowed TRS bandwidth is configured. In some specific cases, the minimum number of PRBs can be smaller than 52 PRBs, and enabled based on a set of associated WD 22 capability signaling;

Every fourth subcarrier is used for the TRS, where the subcarrier offset is configurable; and/or Gold sequences are used to 'randomize' the TRS and ensure low cross-correlation properties.

TRS resource set definition details are provided in the background section. For the demonstrative purposes, the NZP-CSI-RS-Resource entity is considered as follows:

```
NZP-CSI-RS-Resource ::=        SEQUENCE
  nzp-CSI-RS-ResourceId            NZP-CSI-RS-ResourceId,
  resourceMapping            CSI-RS-ResourceMapping,
  powerControl Offset            INTEGER (–8..15),
  powerControlOffsetSS            ENUMERATED{db–3, db0, db3, db6}
  OPTIONAL, -- Need R
  scramblingID        ScramblingId,
  periodicityAndOffset        CSI-ResourcePeriodicityAndOffset
  OPTIONAL, -- Cond PeriodicOrSemiPersistent
  qcl-InfoPeriodicCSI-RS        TCI-StateId
  OPTIONAL, -- Cond Periodic
  ...
```

In the preferred class of embodiments, the following two IEs for differentiating sequences used for PEI signaling may be used:

```
resourceMapping
OFDM symbol location(s) in a slot and subcarrier occupancy in a PRB of
the CSI-RS resource
scramblingID
Scrambling ID (see TS 38.214, clause 5.2.2.3.1)
```

The resourceMapping IE determines the symbol locations in the slot, for the current example relevant to FR1 (4,8), (5,9) or (6,10), and the subcarrier indices in a symbol, (1, 5, 9), (2, 6, 10), (3, 7, 11) or (4, 8, 12). Twelve resource mapping options may be available and used. FR2 allows for even more resources since as described above almost all symbols of a slot (initiating symbols 0 . . . 9) can be used.

The scramblingID IE determines the Gold code seed, or scrambling sequence, used for generating the configured TRS sequence.

In some embodiments, the TRS comes in bursts with a periodicity of 10 ms, 20 ms, 40 ms or 80 ms. In one embodiment, for PEI-TRS, to support one-to-many mapping of PEI, larger periodicity values (160 ms or even 320 ms) may be applied so that the mapping between PEI and PO occasions may be of reduced complexity. If the current parameters result in too many TRS occasions and too few POs, TRS occasions may be pruned for proper mapping.

In one embodiment, the PEI-TRS resource mapping should be defined so that they do not overlap TRS used for conventional, connected-mode purposes. In one embodiment, IEs other than resourceMapping and scramblingID in NZP-CSI-RS-Resource used for PEI-TRS may be determined jointly for all sequences and assumed not to vary between sequences.

In a generic example, it is assumed that the WD 22 is at least in RRC_idle/inactive mode (idle mode for brevity). The WD 22 receives one or more TRS configurations from higher layer signaling (e.g., from SI, RRC release, dedicated signaling, etc.) each with one or more TRS sequences. The TRS configurations can each have a distinguishing resource mapping, e.g., the WD 22 may be provided with a first TRS configuration associated with a first sequence generator, and a second TRS configuration with a second sequence generator. Furthermore, the first and second TRS configurations may be different in at least one additional resource mapping component, e.g., starting RB or RE, the first OFDM symbol, etc. Thus, the resource mapping may be a mapping to a set of at least one sequence and/or, the mapping may include a mapping to time offset(s) and/or frequency offset(s), for example. In the example embodiments below, methods and apparatuses with which the WD 22 can be configured with the potentially multiple TRS configurations are described. These configurations may be optimized. Note that when discussing TRS configurations, TRS used as PEI are sometimes referred to and may be different from the TRS which is configured for connected WDs 22.

TRS Mapping Configuration Information

The network, such as via network node 16, may provide the PEI-TRS resource allocation and additional information mapping via SI (in an existing or new/dedicated system information block (SIB)), via RRC signaling while the WD 22 is connected, via release message, dedicated signaling, non-access stratum (NAS) or in other ways. The following example mapping and configuration aspects may be provided:

The set of TRS (NZ-CSI-RS) resource set definitions for all potentially transmitted TRS, each resource set identified by nzp-CSI-RS-ResourceId (some fields may not be required, e.g., BWP Id, resource type, etc.):

For resource sets only differing in terms of scramblingID, a new signaling approach may be established, e.g. indicating only pairs {nzp-CSI-RS-ResourceId, scramblingID} to avoid duplicating other IE contents;

The number of paging subgroups and mapping to nzp-CSI-RS-ResourceId and/or resourceMapping;

Mapping of additional information fields contents to nzp-CSI-RS-ResourceId and/or scramblingID; and/or Mapping of aggregated subgroup set and additional information fields contents to nzp-CSI-RS-ResourceId and/or scramblingID;

. . .

Configuration aspects stated for TRS may also be applied to CSI-RS.

In another example, the WD 22 may be provided with the necessary configuration parameters related to one TRS, e.g., the list below being an example of such a list though the WD 22 may be configured with a subset of these or potentially additional parameters if needed:

| # | Parameters |
|---|---|
| 1 | aperiodicTriggeringOffset |
| 2 | powerControlOffsetSS |
| 3 | scramblingID |
| 4 | periodicityAndOffset |
| 5 | qcl-InfoPeriodicCSI-RS |
| 6 | firstOFDMSymbolInTimeDomain |
| 7 | startingRB |
| 8 | nrofRBs |
| 9 | subcarrierSpacing (this is not part of CSI-RS resource configuration) |

In one example, the WD 22 receives from higher layer signaling, e.g., SI, multiple TRS configurations which may be grouped in N subgroups. In a related example, multiple TRS configurations may belong the same group, e.g., because they are the same TRS associated with different beams indicated by qcl-InfoPeriodicCSI-RS. For simplicity, this WD 22 may receive N separate groups of TRS configurations. Furthermore, the WD 22 may be configured with one or more additionally distinguishing characteristics, e.g., scrambling sequence representing the hypotheses in a set of hypotheses, as described above. Other combinations are also possible, e.g., using different sequences for different subgroups and then using other characteristics, e.g., different starting RB for different hypotheses. For example, the WD 22 may receive a first TRS configuration associated with the first group, and a second TRS configurations associated with the second, group, and then additionally the first group is configured with a first sequence and a second sequence, and the second group with a third sequence (i.e., not all the hypotheses are configured for all the groups necessarily).

The WD 22 additionally can receive an indication of to which subgroup the WD 22 belongs, or the WD 22 can obtain this based on one or more pre-configured conditions (e.g., based on various criteria described earlier such as WD-ID based, mobility based, WD type based, e.g., if the WD is eMBB, or Redcap, etc.). The pre-configured conditions can be defined, for example, as part of standardization documentations. As mentioned earlier, the assignment to a certain group can be explicit, e.g., TRS specifics are configured and broadcast, where the broadcast configuration specifically may include a sequence for specific group of WDs 22 (e.g. RedCap or GroupX's TRS configuration). Alternately, the assignment to TRS resources are implicit such as through network WD ID assignment, in which case the WD ID serves as an input to a prespecified function from which the output points at a TRS resource. As an example, TRS_Cfg=WD_ID MOD NbrTrsSubGroupingResourceCfgs, where NbrTrsSubGroupingResourceCfgs may be the number of various sub-grouping TRS sequences.

The WD 22 can additionally receive from higher layer signaling, the association of hypotheses to each sequence. Not all the groups need to have the same number of hypotheses. For example, the WD 22 may be configured with a first group and a second group, and additionally indicated about the following:

TABLE 2

| Hypothesis configuration for the first group | |
|---|---|
| First sequence | First hypothesis |
| Second sequence | Second hypothesis |
| Third sequence | Third hypothesis |

TABLE 3

| Hypothesis configuration for the second group | |
|---|---|
| Fourth sequence | Fourth hypothesis |
| Fifth sequence | Fifth hypothesis |

Note that in these examples, the first sequence and the fourth sequence, or the third sequence and the fifth sequence can be the same for the hypothesis.

Furthermore, the WD 22 may be configured (or pre-configured) with the hypothesis mapping as follows.

TABLE 4

| Hypothesis mapping configuration | |
|---|---|
| First hypothesis | One to many PO applicability, e.g., the PEI is related to the next two POs |
| Second hypothesis | If connected mode WD TRS is available or not, e.g., before the next PO |
| Third hypothesis | reserved |

For example, the WD 22 may receive a first sequence in the first group, thus indicating that the WD 22 should expect paging in the next two POs, for example, or that the WD 22 does not detect the second sequence in the first group, indicating that the WD 22 may not expect the connected mode TRS to be available.

In one embodiment, the PEI-TRS resource mapping should be defined so that they do not overlap TRS used for conventional, connected-mode purposes.

In one embodiment, the network may configure the PEI-TRS as 1-slot or 2-slot, depending on cell size and coverage requirements, where 2-slot would be used for poorer coverage. The network may also configure single-symbol TRS for targeting WDs 22 in good coverage.

Approach 1: Resource Set Mapping—Minimizing Number of Required Sequences

In one solution strategy, the total number of required TRS sequences is minimized and sequence detection performance at PEI reception is optimized.

In this approach, in order to obtain an efficient transmission scheme for targeting multiple groups in the same PO, each subgroup n is mapped to a different resource mapping value, as compactly as possible in time to minimize a PEI monitoring window and improve network EE (Network Energy Efficiency). In other words, the WD 22 receives N resource mapping configurations associated with the N subgroups. In one related realization, the WD 22 understands the number of the subgroups from the number of configured resource mappings. In one example, if the number of subgroups does not exceed 4, they may be mapped to up to 4 subcarrier offsets in the same symbol. If the number of subgroups is 5-8 or 9-12, then additional mapping to 1 or 2 adjacent symbol pair locations is used, respectively. If the number of groups exceeds 12, next slots are additionally used. Other combinations are not excluded, e.g., the first subgrouping is performed based on the starting symbol, and then if additional subgroups are needed, a starting RB (or subcarrier offset) are employed. In FR2, more than 3 symbol pairs per slot may be utilized for PEI-TRS for different subgroups.

The additional information instances, hypotheses $m \in \{1, \ldots 2^M\}$, are mapped using different scramblingID values. In some examples, only one additional information instance may be relevant for a given PO (and optionally per group), code multiplexing may not be required in a PO. In other words, in addition to the N TRS resource mapping configurations, the WD 22 may receive $2^M$ sequences per resource mapping configurations, representing additional hypotheses.

Statistically, auto- and cross-correlation properties of different TRS sequences are uniform. However, for a limited-size set, a subset of Gold sequences may be selected with favorable cross-correlation properties, e.g., lower than average cross-correlations between all sequence pairs, or minimizing worst-case cross-correlation instances among all or most pairs.

The described TRS resource allocation may thus be summarized as S(n·m)={resourceMapping$_n$, scramblingID$_m$}. There may additionally be an association between a TRS occasion and a corresponding PO occasion. For example, with 1-to-many mapping, say there are 64 POs per paging cycle (one PO every 20 ms), the PEI-TRS could be a TRS with periodicity of 80 ms, and then every fourth POs may in one case be associated with one TRS occasion. Therefore, in such case, the periodicity and offset of a TRS/CSI-RS may also be used to determine which sequence applies to a certain subgroup in a certain PO.

If the WD 22 population sharing a given PO is divided into N subgroups, each paging transmission will address one or more WDs 22 in one or more subgroups. As a minimum, one WD 22 in one subgroup n will be paged, in which case a single sequence S(n,m) needs to be transmitted. However, it is possible that multiple WDs 22 belonging to multiple subgroups may be targeted, in which case multiple sequences should be transmitted in conjunction with the PO. As a limit case, at least one WD 22 in each subgroup n=1 . . . N may be targeted, necessitating simultaneous transmission of N sequences S(1,m) . . . S(N,m).

Example 1: Consider a PEI configuration consisting of 6 subgroups (N=6), and additional information consisting of 4 multi-PO options (PEI indicating 1, 2, 3 or 4 POs, can be captured in 2 bits) and a TRS availability flag (on/off), i.e., M=3. The PEI-TRS may then be mapped so that the 6 subgroups are located at all four subcarrier offsets in symbols (5,9) and in two adjacent subcarrier offsets (e.g. (1, 5, 9), (2, 6, 10)) in symbols (6,10). In each location, one of 8 code sequences may be applied.

In this approach, the network may transmit PEI in multiple T/F locations per PO but a given WD 22 will monitor only the T/F resource associated with the paging subgroup of the WD 22. The WD 22 will then perform sequence detection among the set of hypotheses corresponding to PEI configuration information, provided e.g. in SI.

Figure 12:
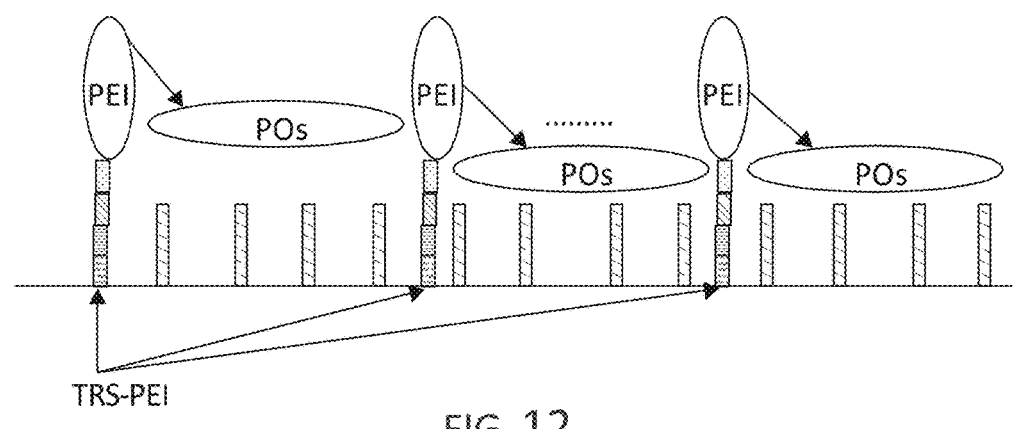
FIG. 12 illustrates paging opportunities.

Example 2: Consider a PEI configuration consisting of 8 subgroups (N=8). The PEI-TRS may then be mapped so that the 8 subgroups are located at all four subcarrier offsets in symbols (5,9) and in two adjacent subcarrier offsets (e.g. (1, 5, 9), (2, 6, 10)) in symbols (6,10), and in each location, two code sequences may be applied. The four locations are shown in FIG. 12 with differently shaded blocks for TRS-PEI. The TRS-PEI occasions are given by the periodicity and offset given by the PEI (or TRS) configuration. The association between the TRS occasion and the paging occasions is shown in the figure below. (Depending in the selected configuration, each subgroup can span across different POs, may be restricted to within a single PO, or both may be possible.)

In another example, the WD 22 may acquire the PEI configuration information and Paging configuration information. The WD 22 can also acquire a WD 22 identifier (e.g., via higher layers, including potentially an ID configured by a RAN or core network). Based on the acquired information, the WD 22 may determine a PEI resource associated with the WD's paging occasion. The PEI resource can include at least one of resource mapping and scrambling identifier. The PEI resource can be a TRS/CSI-RS resource. The WD 22 attempts to detect PEI in the PEI resource. If the WD 22 detects an indication (positive or negative, i.e., presence or absence of the PEI signal, according to configuration information) signaling the WD 22 to wake up and receive a paging message, the WD 22 attempts to decode the paging message in the corresponding paging occasion.

Approach 2: Resource Set Mapping—Minimizing PEI-TRS TX Time and Network Resource Usage In an alternative approach, the PEI-TRS may be mapped to TRS resource sets so as to minimize the number of REs, as well as the time the network uses to transmit the PEI-TRS. In this approach, subgrouping bits may also be used for sequence determination, and all PEI-TRS may be mapped to use a single T/F location. Network resource impact due to PEI transmission is thus minimized, both in terms of REs occupied and in terms of activity time in OFDM symbols.

Since indicating PEI to multiple subgroups in arbitrary combinations should be supported, the number of subgrouping options is $2^N$ and the total number of sequences now becomes $2^{N+M}$. Since the choice of the single sequence conveys information for all relevant subgroups, notation S(n,m) is no longer suitable. Instead, TRS resource set selection may be expressed as S(N, m), where N={n$_1$, . . . , n$_K$}, denotes the set of subgroups targeted in the given PO. A composite subgroup index value i may then be created as value of a length-N bitmap where positions n$_1$, . . . , n$_K$ are set to one. The length-N composite subgroup index value and the length-M additional information bit sequence may be concatenated and used to determine the TRS code used: S(N, m)=scramblingID$_{[i,m]}$.

Example: In the above PEI configuration, the PEI-TRS may be transmitted in a fixed location, e.g., symbols (6,10) and subcarriers (2, 6, 10). The PEI-TRS sequence may be selected based on a bit pattern having 6+3=9 bits, i.e., one of 512 sequences.

In this approach, the network would transmit PEI at a single T/F location per PO that WDs 22 in all subgroups will monitor. A WD 22 may then perform sequence detection among the hypotheses that correspond to the subgroup of the WD 22, out of the total number of sequences which may be determined as $2^{N+M}$, in some embodiments While the WD 22 detection complexity may be similar to Approach 1, detection performance (failure due to detecting incorrect sequence) may be affected due to non-orthogonal Gold sequence design. Detection performance may worsen when the total number of possible sequences increases (here, $2^{N+M}$ instead of $2^M$) and it may not be feasible to select a set of sequences with preferred cross-correlation properties.

As a variant of Approach 2, some subgrouping bits may be used for T/F location selection while the rest may be combined with additional information bits and used for determining the sequence. For example, up to four subgroups or subgroup combinations may be accommodated in a frequency-interleaved manner, using the four subcarrier offsets to obtain non-overlapping TRS resources during a single symbol. If the number of subgroups or combinations exceeds 4, two bits of the subgroup index may be used for subcarrier offset selection and remaining bits merged with additional bits for sequence selection.

Approach 3: Overloading Multiple Sequences in Same T/F Resources

As alternative to above approaches, or as a combination with other approaches, the network could transmit multiple different sequences on the same T/F resources. This would make it possible to send PEI corresponding to multiple subgroups or multiple additional PO option bits, using the same set of resources. For this to work, a high degree of orthogonality between the sequences is required. As transmitting several different sequences (where each of them has a lower power than if only transmitting one sequence) on the same set of resources will lower the signal to interference plus noise ratio (SINR) experienced by the WD 22, one approach is to primarily use the overloading of multiple sequences to WDs 22 that exhibit good radio conditions. An alternative is to keep the individual power on the sequences, allowing the instantaneous power on the TRS resources to momentarily increase, i.e., power boosting the TRS resource elements.

Approach 4: Using Part of TRS Symbol Occasions for Different PEI Configurations

As the TRS configuration reserves two slots with two subcarriers each, and using every $4^{th}$ subcarrier, the detection possibilities when fully using all these resource elements may be more than what is needed to provide required decoding performance. An approach is to let individual PEI sequences only span single slots. One PEI configuration can correspond to symbols in the first slot and another PEI configuration can correspond to symbols in the second slot. The same approach can be done for individual symbols, with one PEI configuration covering only a single symbol.

Yet another alternative can be to let the PEI configuration use a single symbol, and/or use two (or more) different subcarrier offsets. This would provide the same decoding performance as two TRS symbols with a single TRS configuration. However, as the PEI configuration occupies only one symbol in time, the WD 22 can limit the radio on time, thereby reducing the power consumption.

Extensions

Other variations or specific embodiments of PEI-TRS mapping may be used.

The composite sequence (scramblingID) selection may be applied in other combinations, e.g., using different subgrouping and additional information bits for sequence definition.

In one embodiment, aspects of additional information (e.g., availability of active mode TRS) may be conveyed by transmitting PEI-TRS in two different T/F resource locations depending on the availability status, and use the same scramblingID for both locations.

In approach 1, additional information contents may be different for different subgroups in a given PO.

The principles disclosed herein may be used if other sequences are used. For example, if the secondary synchronization signal (SSS) are used, multiple SSS resources may be defined. These SSS may include T/F resource allocation and SSS code allocation components. SSS, preferably without other synchronization signal block (SSB) components, may be configured in the same or nearby symbols where TRS- or DCI-based PEI would be transmitted. One or more SSS per symbol may be configured in different frequency regions. Subgroup mapping is preferably performed by assigning T/F resources that are temporally close (Frequency-multiplexed or adjacent symbols) and additional information mapping may be achieved by SSS sequence index assignments to different information combinations.

PEI-TRS T/F-location and/or sequence allocation may be coordinated among neighbor cells to avoid resource collisions. The TRS configurations may have cell specific characteristics. For example, in a network node 16 such as a gNB that is covering a small area, a 2 slot TRS configuration may not be necessary as sufficient number of resource elements may be reliably received by cell edge WDs 22 in a single slot TRS configuration. In such case, the network may still want to use a 2 slot configuration, but not for the sake of robust reception, but rather as an information code-point. For example, a single slot TRS configuration may be interpreted as a System information Update indication, whereas 2 slot TRS configurations may be interpreted as an earthquake and tsunami warning system (ETWS) notification.

The TRS configuration may have group specific characteristics. For example, the network may want to have specific TRS configuration for specific type of devices. As an example, the network may want to have a more robust TRS configuration for RedCap devices. As such, the various POs may be configured with different TRS configurations. However, to keep the configuration simple when many POs are configured in the cell, not all individual POs need to be separately configured. Instead a limited set of configurations are provided and applicable to the set of POs. For example, 2 TRS configuration sets can be configured, one for POs belonging to odd frames and another for POs belonging to even frames. In this example, assume that RedCap devices are assigned to odd POs. Then, the network may configure odd-PO-TRS such that they are over 2 slots and/or have higher output power (i.e. configured by powerControlOff-setSS).

According to one aspect, a network node 16 is configured to communicate with a wireless device (WD) 22. The network node 16 includes a radio interface 62 and/or processing circuitry 68 configured to generate a tracking reference signal, TRS, based at least in part on a minimization of a total number of TRS sequences and at least in part on an optimization of a paging early indicator, PEI, sequence detection performance.

According to this aspect, in some embodiments, generating the TRS includes performing, via the processing circuitry 68, a minimization of a PEI-TRS transmit time and/or network resource usage. In some embodiments, PEI-TRS are mapped, via the processing circuitry 68, to TRS resource sets so as to minimize a number of resource elements to transmit the PEI-TRS. In some embodiments, the network node 16, processing circuitry 68, and/or radio interface 62 are further configured to transmit multiple different sequences on a same set of time/frequency resources. In some embodiments, the network node 16, processing circuitry 68 and/or radio interface 62 are further configured to use part of a TRS symbol occasion for different PEI configuration.

According to another aspect, method implemented in a network node 16 includes generating, via the processing circuitry 68, a tracking reference signal, TRS, based at least in part on a minimization of a total number of TRS sequences and at least in part on an optimization of a paging early indicator, PEI, sequence detection performance.

According to this aspect, in some embodiments, wherein the TRS includes performing a minimization of a PEI-TRS transmit time and/or network resource usage. In some embodiments, PEI-TRS are mapped, via the processing circuitry 68, to TRS resource sets so as to minimize a number of resource elements to transmit the PEI-TRS. In some embodiments, the method includes transmitting, via the radio interface 62, multiple different sequences on a same set of time/frequency resources. In some embodiments, the method further includes using part of a TRS symbol occasion for different PEI configuration.

According to yet another aspect, a WD 22 is configured to communicate with a network node 16. The WD 22 includes a radio interface 82 and/or processing circuitry 84 configured to: receive a number of resource mapping configurations; and determine a number of subgroups in a same paging occasion based at least in part on the received resource mapping configurations.

According to this aspect, in some embodiments, the WD 22, processing circuitry 84 and/or radio interface 82 are further configured to map one or more subgroups to one or more subcarrier offsets. In some embodiments, the WD 22, processing circuitry 84 and/or radio interface 82 are further configured to perform sequence detection among a set of sequence hypotheses that correspond to a subgroup. In some embodiments, the WD 22, processing circuitry 84 and/or radio interface 82 are further configured to expect paging in at least one subsequent paging occasion.

According to yet another aspect, a method implemented in a wireless device (WD) 22 includes receiving, via the radio interface 82, a number of resource mapping configurations, and determining, via the processing circuitry 84, a number of subgroups in a same paging occasion based at least in part on the received resource mapping configurations.

According to this aspect, in some embodiments, the method further includes mapping via the processing circuitry 84 one or more subgroups to one or more subcarrier offsets. In some embodiments, the method also includes performing, via the processing circuitry 84, sequence detection among a set of sequence hypotheses that correspond to a subgroup. In some embodiments, the method also includes expecting, via the processing circuitry 84, paging in at least one subsequent paging occasion.

Some embodiments may include one or more of the following.

Embodiment A1. A network node configured to communicate with a wireless device (WD), the network node configured to, and/or comprising a radio interface and/or comprising processing circuitry configured to:

generate a tracking reference signal, TRS, based at least in part on a minimization of a total number of TRS sequences and at least in part on an optimization of a paging early indicator, PEI, sequence detection performance.

Embodiment A2. The network node of Embodiment A1, wherein generating the TRS includes performing a minimization of a PEI-TRS transmit time and/or network resource usage.

Embodiment A3. The network node of Embodiment A2, wherein PEI-TRS are mapped to TRS resource sets so as to minimize a number of resource elements to transmit the PEI-TRS.

Embodiment A4. The network node of Embodiment A1, wherein the network node, processing circuitry, and/or radio interface are further configured to transmit multiple different sequences on a same set of time/frequency resources.

Embodiment A5. The network node of Embodiment A1, wherein the network node, processing circuitry and/or radio interface are further configured to use part of a TRS symbol occasion for different PEI configuration.

Embodiment B1. A method implemented in a network node, the method comprising:

generating a tracking reference signal, TRS, based at least in part on a minimization of a total number of TRS sequences and at least in part on an optimization of a paging early indicator, PEI, sequence detection performance.

Embodiment B2. The method of Embodiment B1, wherein generating the TRS includes performing a minimization of a PEI-TRS transmit time and/or network resource usage.

Embodiment B3. The method of Embodiment B2, wherein PEI-TRS are mapped to TRS resource sets so as to minimize a number of resource elements to transmit the PEI-TRS.

Embodiment B4. The method of Embodiment B1, further comprising transmitting multiple different sequences on a same set of time/frequency resources.

Embodiment B5. The method of Embodiment B1, further comprising using part of a TRS symbol occasion for different PEI configuration.

Embodiment C1. A wireless device (WD) configured to communicate with a network node, the WD configured to, and/or comprising a radio interface and/or processing circuitry configured to:

receive a number of resource mapping configurations; and determine a number of subgroups in a same paging occasion based at least in part on the received resource mapping configurations.

Embodiment C2. The WD of Embodiment C1, wherein the WD, processing circuitry and/or radio interface are further configured to map one or more subgroups to one or more subcarrier offsets.

Embodiment C3. The WD of Embodiment C1, wherein the WD, processing circuitry and/or radio interface are further configured to perform sequence detection among a set of sequence hypotheses that correspond to a subgroup.

Embodiment C4. The WD of Embodiment C1, wherein the WD, processing circuitry and/or radio interface are further configured to expect paging in at least one subsequent paging occasion.

Embodiment D1. A method implemented in a wireless device (WD), the method comprising:

receiving a number of resource mapping configurations; and determining a number of subgroups in a same paging occasion based at least in part on the received resource mapping configurations.

Embodiment D2. The method of Embodiment D1, further comprising mapping one or more subgroups to one or more subcarrier offsets.

Embodiment D3. The method of Embodiment D1, further comprising performing sequence detection among a set of sequence hypotheses that correspond to a subgroup.

Embodiment D4. The method of Embodiment D1, further comprising expecting paging in at least one subsequent paging occasion.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

5G-S-TMSI Serving Temporary Mobile Subscriber Identity
ACK Acknowledgment
ACK/NACK Acknowledgment/Not-acknowledgment
BWP Bandwidth Part
CSI-RS Channel State Information Reference Signal
DCI Downlink Control Information
DRX Discontinuous Reception
HARQ Hybrid Automatic Repeat Request
I-RNTI Inactive Radio Network Temporary Identifier
MCS Modulation and Coding Scheme
MIMO Multiple Input Multiple Output
NACK Not-acknowledgment
PRB Physical Resource Block
PPM Parts Per Million
PDCCH Physical Downlink Control Channel
PDSCH Physical Downlink Shared Channel
PEI Paging Early Indicator
PO Paging Occasion
PUCCH Physical Uplink Control Channel
SE Spectral efficiency
SFN System Frame Number
SI System Information
SSB Synchronization Signal Block
SNR Signal to Noise Ratio
TB Transport Block
TRS Tracking Reference Signal or CSI-RS for tracking
UCI Uplink Control Information It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method performed by a network node for signaling additional information in conjunction with signaling of a Paging Early Indicator, PEI, to at least one of a plurality of wireless devices, WDs, included in a paging group, the method comprising:

signaling to the plurality of WDs tracking reference signal, TRS, configurations for each of N paging subgroups of WDs, the plurality of WDs being subgrouped into the N paging subgroups, N being an integer greater than zero, each TRS configuration being associated with an instance of additional information out of a set of possible instances of additional information; and transmitting to the at least one WD a TRS conveying the PEI in accordance with a TRS configuration for a particular paging subgroup of the N paging subgroups, the at least one WD being included in the particular paging subgroup, the TRS configured to indicate to the at least one WD a subsequent paging occasion, PO, to be monitored by the at least one WD, the TRS being associated with a particular additional information instance out of the set of possible additional information instances.

2. A network node for signaling additional information in conjunction with signaling of a Paging Early Indicator, PEI, to at least one of a plurality of wireless devices, WDs, included in a paging group, the network node comprising:

processing circuitry configured to signal, to the plurality of WDs, tracking reference signal, TRS, configurations for each of N paging subgroups of WDs, the plurality of WDs being sub-grouped into the N paging subgroups, N being an integer greater than zero, each TRS configuration being associated with an instance of additional information out of a set of possible instances of additional information; and a radio interface in communication with the processing circuitry and configured to transmit to the at least one WD, a TRS conveying the PEI in accordance with a TRS configuration for a particular paging subgroup of the N paging subgroups, the at least one WD being included in the particular paging subgroup, the TRS configured to indicate to the at least one WD a subsequent paging occasion, PO, to be monitored by the at least one WD, the TRS being associated with a particular additional information instance out of the set of possible additional information instances.

3. The network node of claim 2, wherein each WD of the plurality of WDs is in at least one paging subgroup.

4. The network node of claim 2, wherein the plurality of WDs are distributed randomly among the N paging subgroups.

5. The network node of claim 2, wherein the plurality of WDs are distributed among the N paging groups based at least in part on at least one of:

type of WD, a WD radio resource control, RRC, state, and a respective paging probability associated with each WD.

6. The network node of claim 2, wherein each of a plurality of the set of possible instances of additional information corresponds to a different sequence of a plurality of sequences.

7. The network node of claim 6, wherein the radio interface is further configured to transmit a plurality of the different sequences on a same set of time-frequency resources.

8. The network node of claim 2, wherein the processing circuitry is further configured to map multiple paging subgroups to different time/frequency locations, wherein the mapping is performed so as to minimize a duration of a PEI monitoring window.

9. A method performed by a wireless device, WD, for receiving additional information in conjunction with Paging Early Indicator, PEI, signaling from a network node, the WD being one of a plurality of wireless devices, WDs, included in a paging group, the method comprising:

receiving from the network node, at least one tracking reference signal, TRS, configuration, for each of N paging subgroups of WDs, the plurality of WDs being sub-grouped into the N paging subgroups, N being an integer greater than zero, each of the at least one TRS configuration being associated with an instance of additional information out of a set of possible instances of additional information; and receiving, from the network node, a TRS conveying a PEI in accordance with a TRS configuration for a particular paging subgroup of the N paging subgroups, the WD being included in the particular paging subgroup, the TRS configured to indicate to the WD a subsequent paging occasion, PO, to be monitored by the WD, the TRS being associated with a particular additional information instance out of the set of possible additional information instances.

10. The method of claim 9, wherein each of a plurality of the set of possible instances of additional information is associated with a respective sequence out of a set of sequences.

11. The method of claim 9, wherein the receiving the TRS conveying the PEI includes monitoring for a plurality of sequences on a same time-frequency resource.

12. The method of claim 9, further comprising correlating a sequence in the received TRS with each of at least one sequence corresponding to a paging group to which the WD belongs.

13. The method of claim 9, further comprising, when the WD belongs to a plurality of paging groups, determining which paging group of the plurality of paging groups is being paged.

14. A WD configured for receiving additional information in conjunction with Paging Early Indicator, PEI, signaling from a network node, the WD being one of a plurality of wireless devices, WDs, included in a paging group, the WD comprising:

a radio interface configured to:

receive from the network node, at least one tracking reference signal, TRS, configuration, for each of N paging subgroups of WDs, the plurality of WDs being sub-grouped into the N paging subgroups, N being an integer greater than zero, each of the at least one TRS configuration being associated with an instance of additional information out of a set of possible instances of additional information; and receive, from the network node, a TRS conveying a PEI in accordance with a TRS configuration for a particular paging subgroup of the N paging subgroups, the WD being included in the particular paging subgroup, the TRS configured to indicate to the WD a subsequent paging occasion, PO, to be monitored by the WD, the TRS being associated with a particular additional information instance out of the set of possible additional information instances.

15. The WD of claim 14, wherein each of a plurality of the set of possible instances of additional information is associated with a respective sequence out of a set of sequences.

16. The WD of claim 15, further comprising processing circuitry configured to:

when the WD belongs to a plurality of paging groups, determine which paging group of the plurality of paging groups is being paged.

17. The WD of claim 15, further comprising processing circuitry configured to identify the particular instance of additional information associated with the received TRS conveying the PEI by performing hypothesis testing based on the set of possible instances of additional information.

18. The WD of claim 17, wherein the processing circuitry is further configured to monitor one or more subsequent POs based on the identified particular instance of additional information.

19. The WD of claim 18, wherein the radio interface being configured to receive the TRS conveying the PEI includes processing circuitry being configured to, via the radio interface, monitor for a plurality of sequences on a same time-frequency resource.

20. The WD of claim 14, further comprising processing circuitry configured to correlate a sequence in the received TRS with each of at least one sequence corresponding to a paging group to which the WD belongs.

* * * * *